United States Patent [19]
Itoh

[11] Patent Number: 5,652,919
[45] Date of Patent: Jul. 29, 1997

[54] OPTICAL APPARATUS HAVING FUNCTION FOR TESTING SHAKE COMPENSATION BY USING EXTERNAL COMUNICATION

[75] Inventor: Junichi Itoh, Hachioji, Japan

[73] Assignee: Olympus Optical Co., Ltd., Tokyo, Japan

[21] Appl. No.: 514,671

[22] Filed: Aug. 14, 1995

[30] Foreign Application Priority Data

Aug. 25, 1994 [JP] Japan .................................. 6-200870

[51] Int. Cl.$^6$ .................................................. G03B 7/08
[52] U.S. Cl. ............................................................ 396/33
[58] Field of Search ........................... 354/70, 202, 430, 354/195.12; 396/52, 53, 54, 55

[56] References Cited

U.S. PATENT DOCUMENTS 4,671,640 6/1987 Akada et al. .......................... 354/402
5,266,988 11/1993 Washisu ................................. 354/70

FOREIGN PATENT DOCUMENTS 4-361240 12/1992 Japan .

*Primary Examiner*—Safet Metjahic
*Assistant Examiner*—Nicholas T. Tuccillo
*Attorney, Agent, or Firm*—Frishauf, Holtz, Goodman, Langer & Chick

[57] ABSTRACT

In order to allow a quantitative measurement of the operation of an image blurring correction function by adding an effective test function to a camera, an image blurring correction mechanism detects the shaken states of the camera with respect to two orthogonal axes around the photographing optical axis of the camera. The image blurring correction mechanism is arranged in the optical path between a photographing lens and a film and has two axes of freedom corresponding to the above two axes. An external communication (control) terminal is used for external communication with a main microcomputer in the camera. When a test mode command is externally input to the camera via the external communication terminal, a sub-microcomputer in a shake compensation circuit performs specific operation control, through the main microcomputer, to execute a shake compensation function with respect to the image blurring correction mechanism.

15 Claims, 19 Drawing Sheets

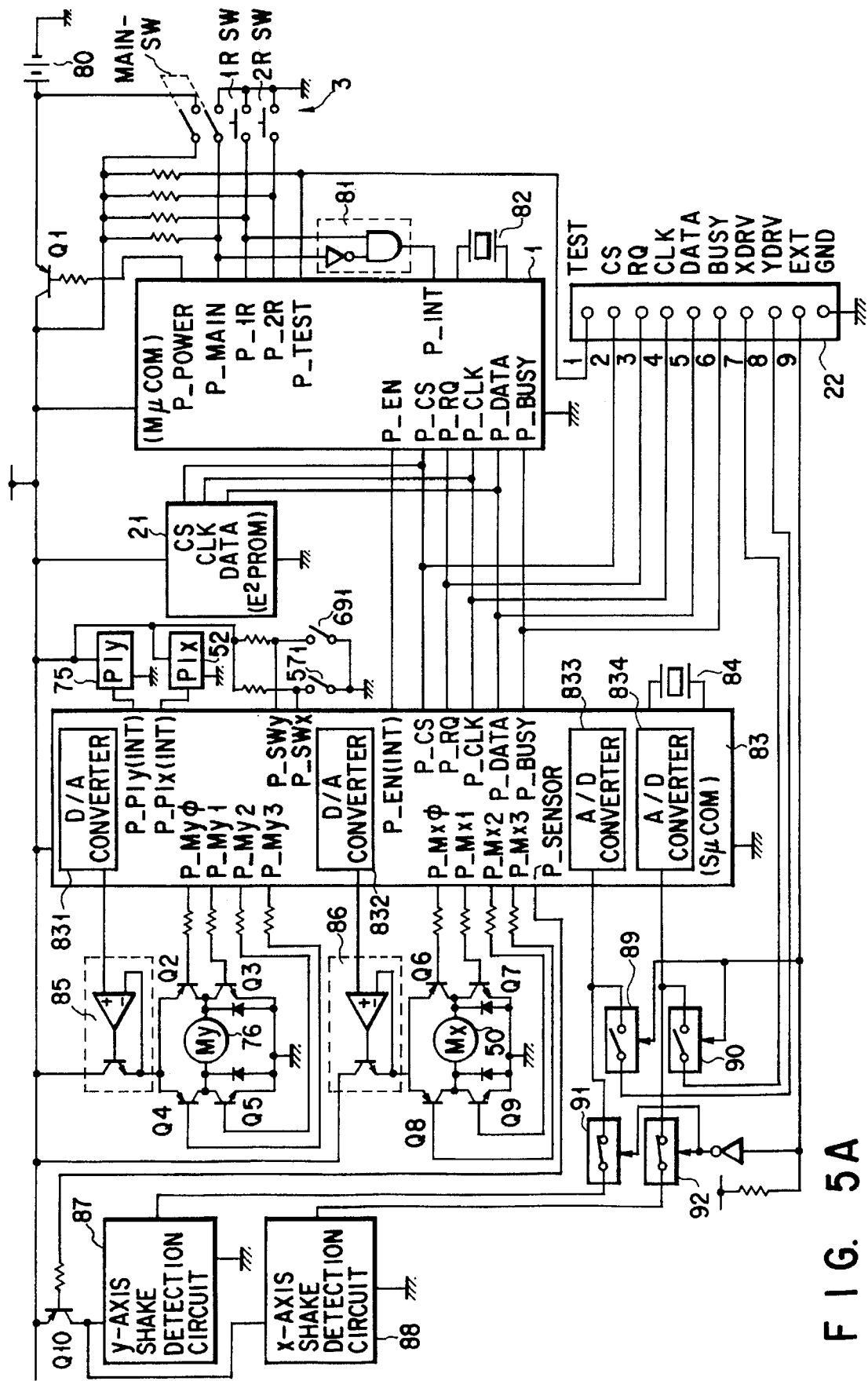
F I G. 5A

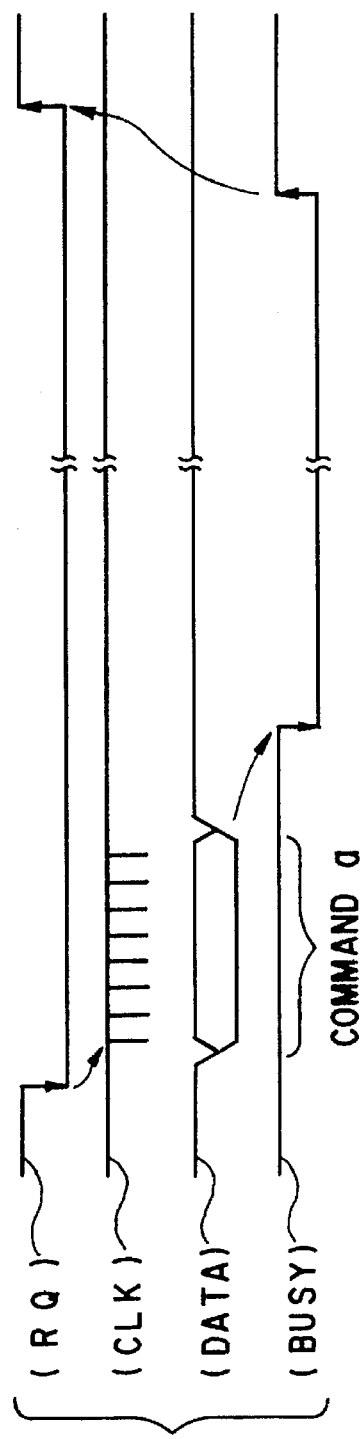
F I G. 7
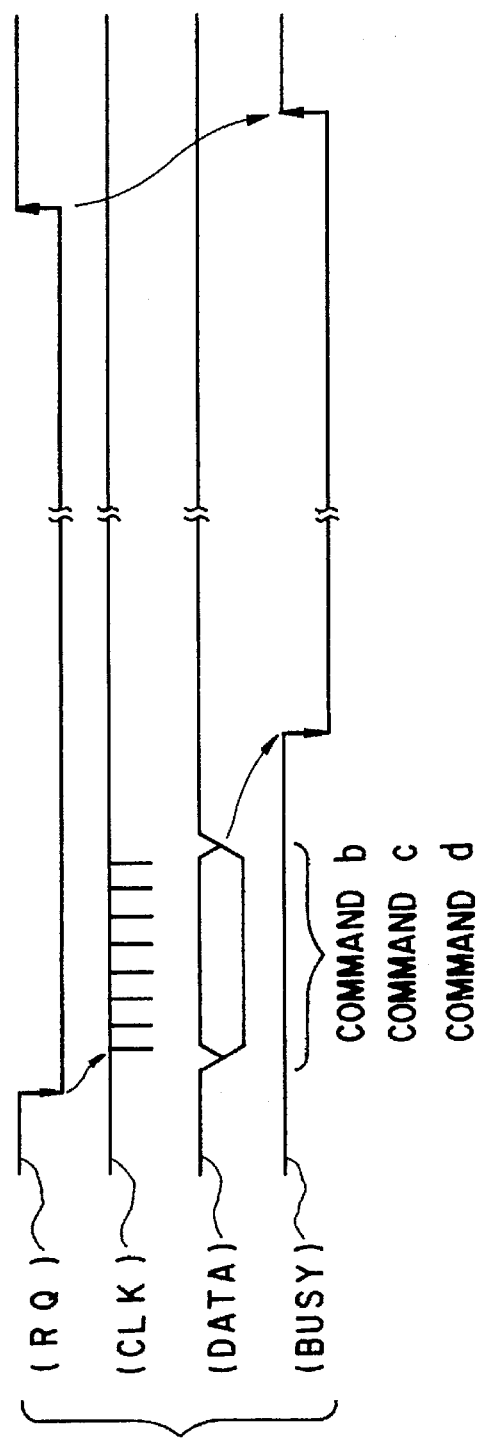
F I G. 8

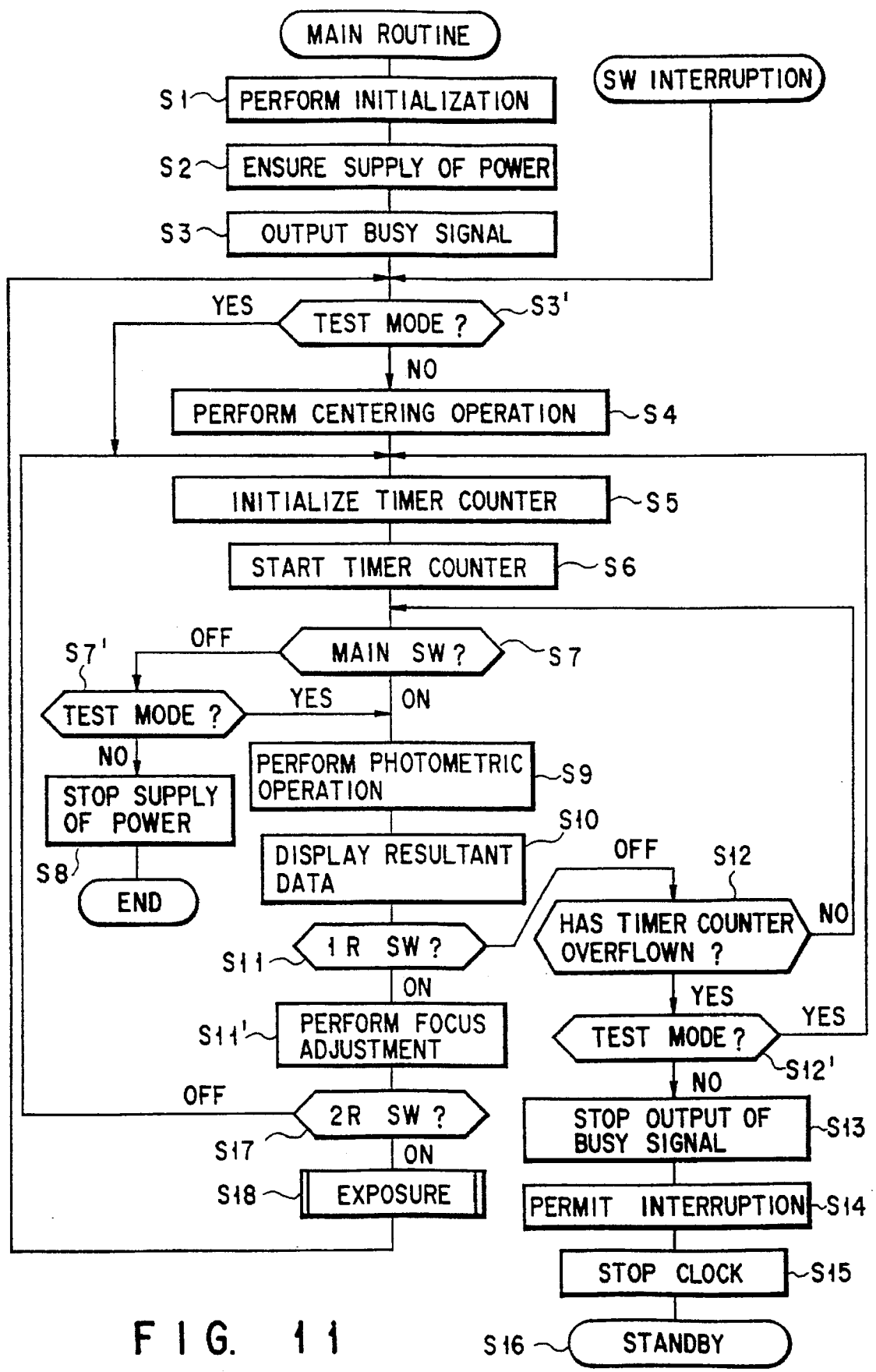
F I G. 11

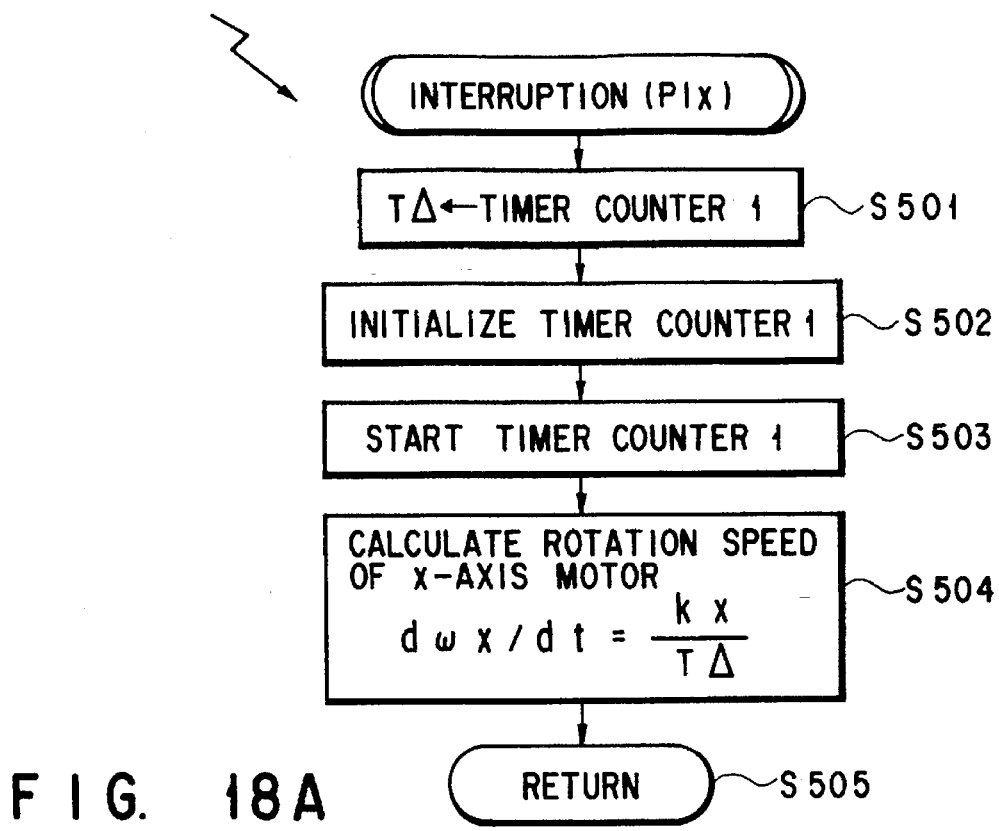
F I G. 18A
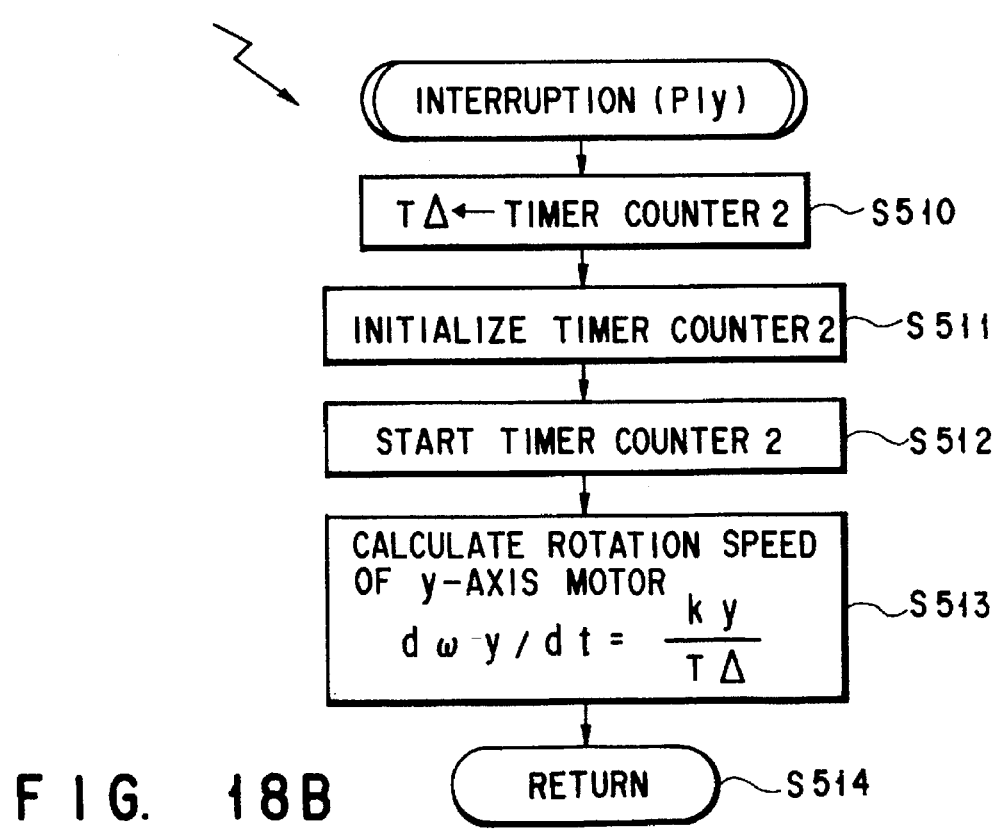
F I G. 18B 5,652,919

OPTICAL APPARATUS HAVING FUNCTION FOR TESTING SHAKE COMPENSATION BY USING EXTERNAL COMUNICATION

BACKGROUND OF THE INVENTION

1. Field of the Invention

The present invention relates to an optical apparatus having a function for testing shake compensation by using external communication and, more particularly, to an optical apparatus capable of image blurring correction, such as a camera for detecting a camera shake, and driving a correction optical member inserted in the optical path of a photographing optical system on the basis of the detection value to reduce the influence of image blurring which is caused during a film exposure operation.

2. Description of the Related Art

Various techniques for image blurring correction optical systems used for optical apparatuses such as cameras have been proposed. For example, in the prior art shown in FIG. 22, a parallel glass 302 is arranged on the image plane side of a photographing lens 301, and any blurring of an image on a film surface 303 is corrected by inclining the parallel glass 302 in accordance with the blurring amount of the image.

In the prior art shown in FIG. 23, a variable vertical angle prism 304 constituted by two types of elastic members 304a and 304b is arranged on the object side of a photographing lens 301, and the vertical angle of the prism 304 is changed by actuators 305a and 305b in accordance with the total shake amount of the photographing optical system, thereby correcting the blurring of an image on an imaging plane 303.

In addition, a technique of correcting image blurring by moving part of a photographing lens system in accordance with the shake amount is also known.

A technique associated with a camera having an operation mode of checking an image blurring correction function is disclosed in Jpn. Pat. Appln. KOKAI Publication No. 4-361240. In this camera, the operation of the image blurring correction function can be arbitrarily checked by operating a predetermined switch.

According to the technique disclosed in Jpn. Pat. Appln. KOKAI Publication No. 4-361240, however, even if the image blurring correction function is used, the user can only determine through the viewfinder that "the image blurring correction function is ON". In this prior art, therefore, the operation of the image blurring correction function cannot be quantitatively evaluated, and the user can only determine whether the function is working or not.

SUMMARY OF THE INVENTION

It is, therefore, an object of the present invention to provide a new and improved optical apparatus having a function for testing shake compensation by using external communication in which the operation of an image blurring correction function can be quantitatively measured and evaluated by adding an effective function for testing shake compensation to the apparatus.

According to an aspect of the present invention, there is provided a camera which can suppress blurring of a photographed image due to a vibration of the camera, comprising:

(a) first and second vibration detection means for detecting vibrating states of the camera with respect to first and second orthogonal axes around a photographing optical axis of the camera;

(b) correction means including a correction optical system arranged between a photographing optical system of the camera and a film exposure surface and having two axes of freedom corresponding to the first and second axes;

(c) control means for controlling the correction optical system;

(d) a communication terminal for allowing external communication with the control means in the camera; and (e) test mode means for performing a predetermined operation in accordance with a test mode command externally input to the camera via the communication terminal.

According to another aspect of the present invention, there is provided an optical apparatus including:

shake detection means for detecting a shake of an optical axis of an optical system included in the optical apparatus;

image blurring correction optical system, arranged on the optical axis, for correcting the shake;

image blurring correction means for controlling the image blurring correction optical system on the basis of an output from the shake detection means; and means for executing a check operation with respect to at least one of the shake detection means and the image blurring correction means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 5A and 5B are block diagrams showing the detailed arrangements of the peripheral circuits, e.g., a shake compensation circuit 14 and an operation switch section 3, of a MμCOM 1, and an external apparatus in FIG. 1;

FIG. 7 is a timing chart for explaining a communication method of causing a SμCOM 83 in FIG. 5 to operate in an a mode;

FIG. 8 is a timing chart for explaining a communication method of causing the SμCOM 83 in FIG. 5A to operate in a b mode, a c mode and a d mode;

FIG. 11 is a flow chart showing the sequence of the main routine executed by the MμCOM 1 in FIG. 1;

FIGS. 18A and 18B are flow charts showing interrupt processing in FIG. 13;

DETAILED DESCRIPTION OF THE PREFERRED EMBODIMENTS

Figure 1:
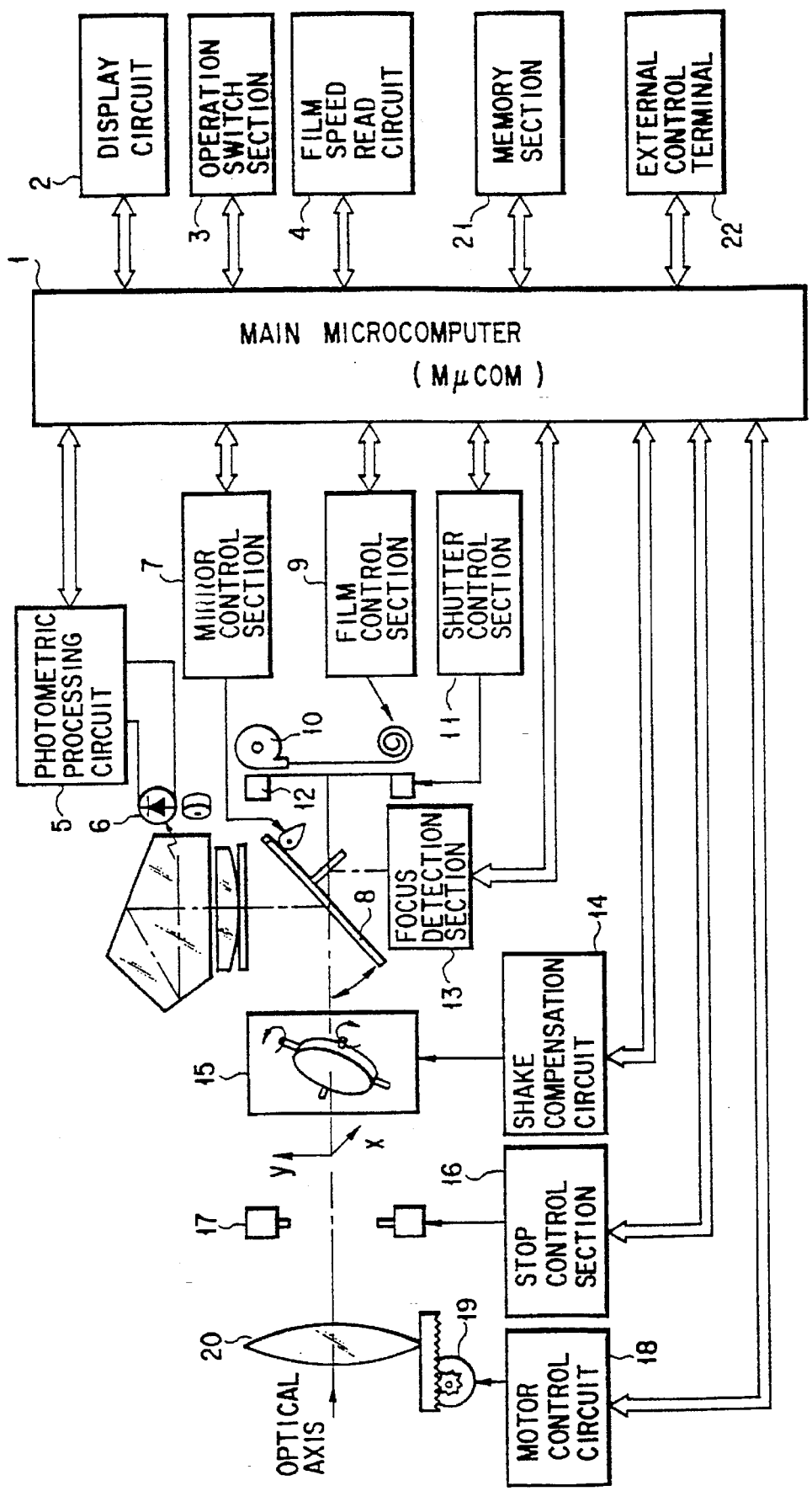
FIG. 1 is a block diagram showing the arrangement of a camera system according to an embodiment of the present invention.

Reference will now be made in detail to the presently preferred embodiments of the invention as illustrated in the accompanying drawings, in which like reference characters designate like or corresponding parts throughout the several drawings.

An optical apparatus according to an embodiment of the present invention will be described below with reference to the accompanying drawings.

FIG. 1 shows the arrangement of a camera system to which an optical apparatus according to an embodiment of the present invention is applied.

As shown in FIG. 1, a display circuit 2, an operation switch section 3, and a film speed read circuit 4 are electrically connected to a main microcomputer (to be referred to as a MμCOM hereinafter) 1 for performing sequence control of the overall camera system and various arithmetic operations. The display circuit 2 displays the operation mode or data calculated by the MμCOM 1. The operation switch section 3 includes a release switch and a main switch. The film speed read circuit 4 reads the DX code of a film 10 and outputs the film speed information to the MμCOM 1.

A photoelectric conversion element 6 for photometry is electrically connected to a photometric processing circuit 5. The photometric processing circuit 5 is electrically connected to the MμCOM 1. The photometric processing circuit 5 detects the brightness of an object to be photographed on the basis of a photocurrent obtained by the photoelectric conversion element 6, and outputs the resultant brightness information to the MμCOM 1.

In addition, a mirror control section 7, a film control section 9, and a shutter control section 11 are electrically connected to the MμCOM 1. The mirror control section 7 controls the upward/downward movement of a quick return mirror 8. The film control section 9 controls the automatic film wind/rewind operation for the film 10. The shutter control section 11 controls the front and rear curtains of a focal plane shutter 12.

The MμCOM 1 is also electrically connected to a focus detection section 13, a shake compensation circuit 14, a stop control section 16, and motor control circuit 18. The focus detection section 13 outputs data required for detection of the defocus amount to the MμCOM 1. The MμCOM 1 calculates the moving amount, of a photographing lens 20, which is required for focus adjustment on the basis of the data. The driving operation of a motor 19 is controlled by the motor control circuit 18 on the basis of the calculated moving amount.

Figure 2:
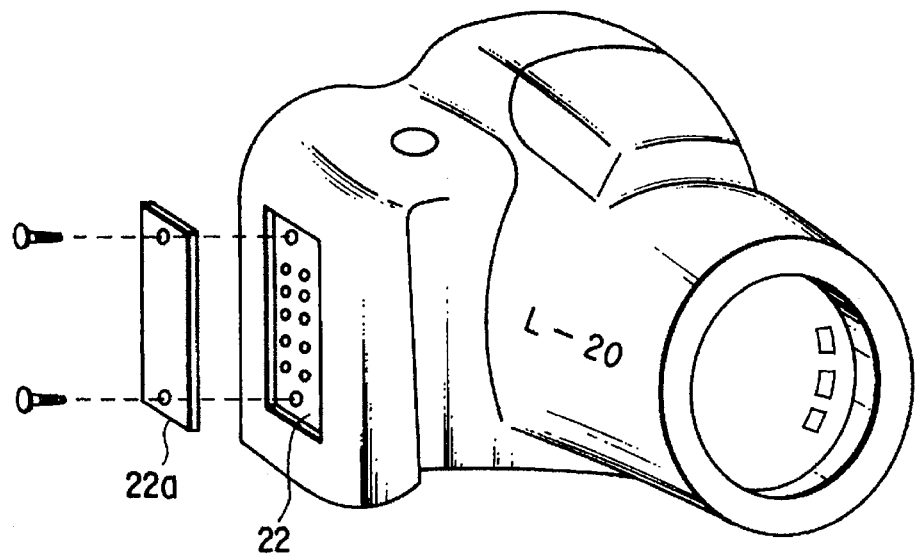
FIG. 2 is a perspective view showing the outer appearance of an external communication or control terminal 22 in FIG. 1.

The shake compensation circuit 14 is a circuit for controlling a shake compensation mechanism 15 including a sensor for detecting any camera shake. The stop control section 16 controls a stop 17 on the basis of stop data calculated by the MμCOM 1. A memory section 21 is a nonvolatile memory constituted by an EEPROM. An external communication or control terminal 22 is used to input an external control signal. For example, as shown in FIG. 2, this external control terminal 22 is exposed when a cover 22a is removed from the exterior of the camera. The function of the external control terminal 22 will be described later.

The arrangement of the shake compensation mechanism 15 will be described in detail below with reference to FIG. 3.

Figure 3:
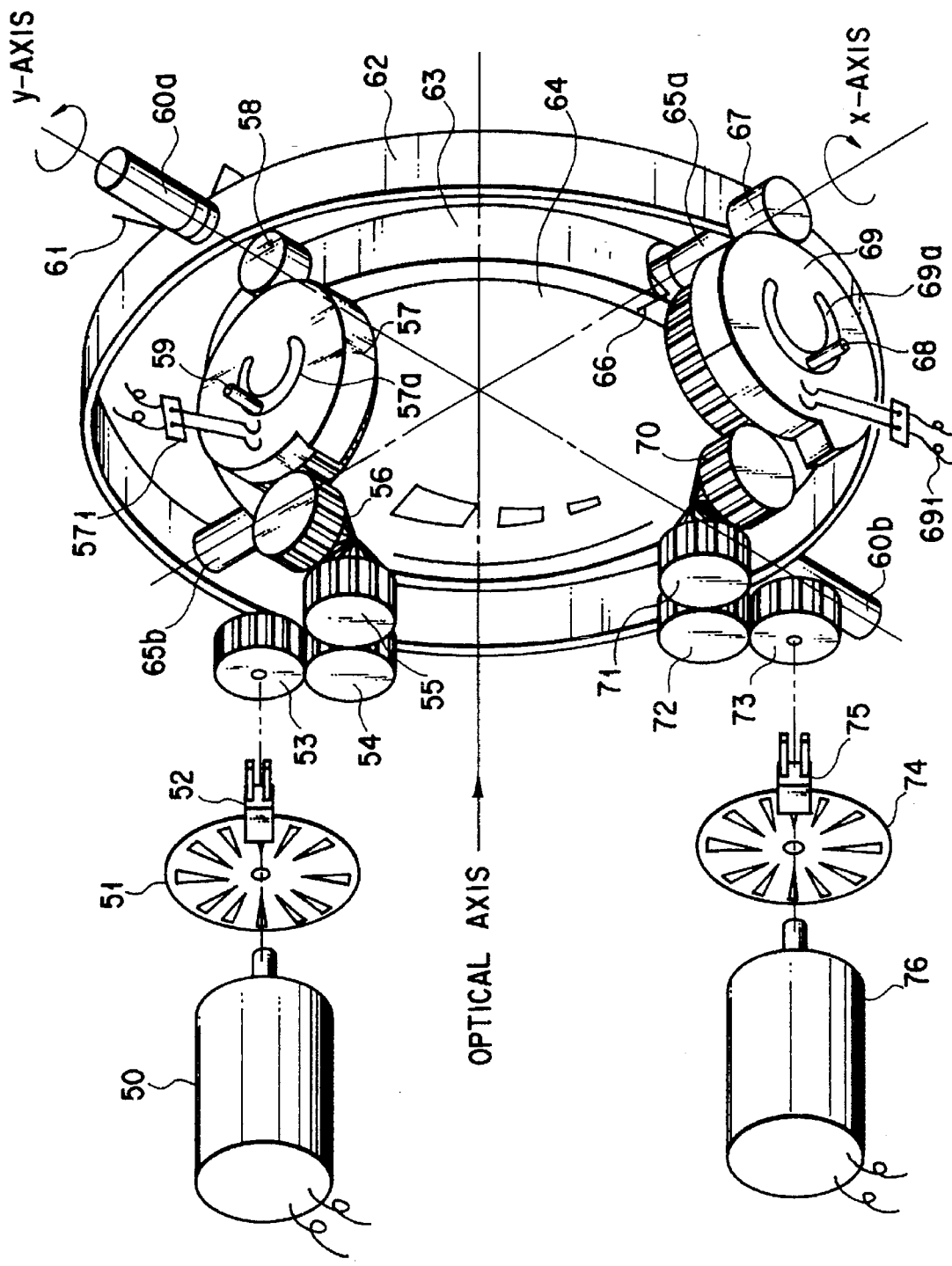
FIG. 3 is a perspective view showing the detailed arrangement of a shake compensation mechanism 15 in FIG. 1.

As shown in FIG. 3, a parallel glass 64 is engaged with an inner frame 63, which is rotatably engaged with on an outer frame 62 via shafts 65a and 65b. The outer frame 62 is rotatably held on the camera body or mirror frame (not shown) via shafts 60a and 60b. An x-axis motor 50 is a motor for rotating the parallel glass 64 about the x-axis shown in FIG. 3. A disk 51 with slits and a gear 53 are fixed to the rotating shaft of the x-axis motor 50. When the x-axis motor 50 rotates, a photointerruptor 52 generates a pulse signal every time a slit of the disk 51 crosses the photointerruptor 52. The rotational speed of the x-axis motor 50 and the rotational amount of the parallel glass 64 in the x-axis direction can be detected from the pulse signals. The rotational force of the x-axis motor 50 is mechanically transmitted to a cam gear 57 via gears 53 to 56. The cam portion of the cam gear 57 is in contact with a cam follower 58 fixed to the inner frame 63. The cam follower 58 is pressed against the cam gear 57 by a spring 66. A groove 57a is formed in the cam gear 57. A shaft 59 engaged with the groove 57a of the cam gear 57 is fixed to the camera body or mirror frame (not shown). Therefore, the shaft 59 in the groove 57a slides to regulate the rotation range of the cam gear 57. The rotation limit position of the cam gear 57 is detected by an x-axis limit switch 571.

A y-axis motor 76 is a motor for rotating the parallel glass 64 about the y-axis shown in FIG. 3. A disk 74 with slits and a gear 73 are fixed to the rotating shaft of the y-axis motor 76. When the y-axis motor 76 rotates, a photointerruptor 75 generates a pulse signal every time a slit of the disk 74 crosses the photointerruptor 75. The rotational speed of the y-axis motor 76 and the rotational amount of the parallel glass 64 in the y-axis direction can be detected from the pulse signals. The rotational force of the y-axis motor 76 is mechanically transmitted to a cam gear 69 via gears 70 to 73. The cam portion of the cam gear 69 is in contact with a cam follower 67 fixed to the outer frame 62. The cam follower 67 is pressed against the cam gear 69 by a spring 61. A groove 69a is formed in the cam gear 69. A shaft 68 engaged with the groove 69a of the cam gear 69 is fixed to the camera body or mirror frame (not shown). Therefore, the shaft 68 in the groove 69a slides to regulate the rotation range of the cam gear 69. The rotation limit position of the cam gear 69 is detected by a y-axis limit switch 691.

Figure 4:
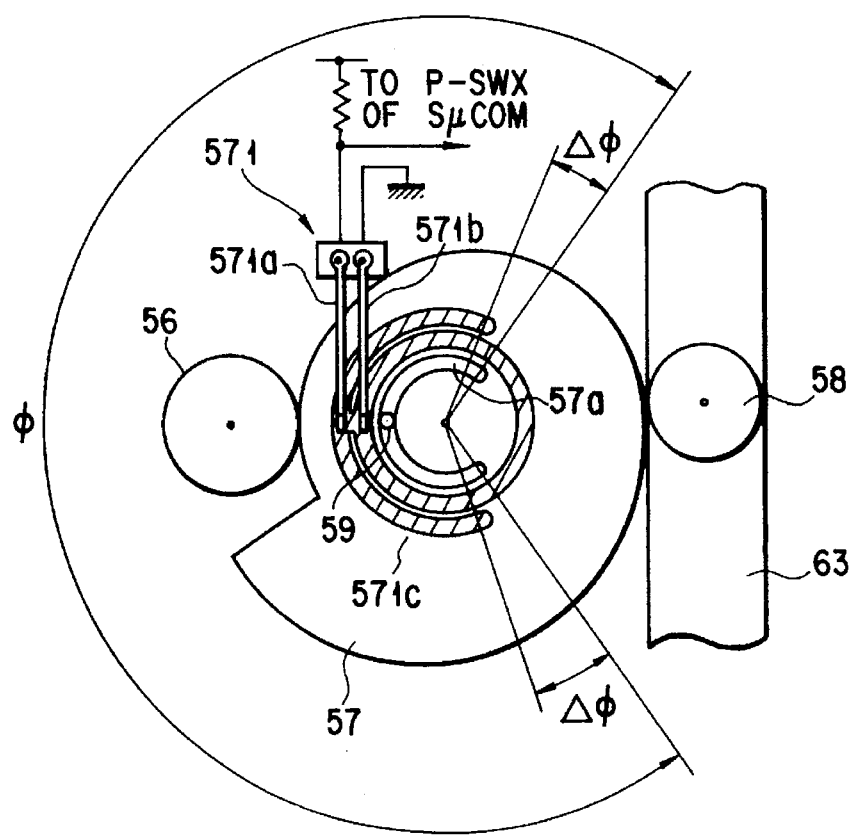
FIG. 4 is a plan view showing the detailed arrangement of an x-axis limit switch 571 in FIG. 3.

FIG. 4 shows the detailed arrangement of the x-axis limit switch 571.

As shown in FIG. 4, the x-axis limit switch 571 is constituted by contact pieces 571a and 571b, and a conductive pattern 571c formed on the surface of the cam gear 57. The cam gear 57 is rotatable within the range of an angle φ. The x-axis limit switch 571 changes from the ON state to the OFF state near the rotation limit of the cam gear 57. This x-axis limit switch 571 is connected to an input terminal p-SWx of a sub-microcomputer (SμCOM) 83 to execute an operation for shake compensation (to be described later). When the x-axis limit switch 571 is turned off while the x-axis motor 50 is driven, the SμCOM 83 brakes the x-axis motor 50 to stop the rotation of the cam gear 57. Since the motor 50 cannot be stopped immediately after it is braked, the x-axis limit switch 571 changes from the ON state to the OFF state an angle Δφ before the limit of the rotation range of the x-axis limit switch 571. This angle Δφ should be determined in consideration of the control characteristics of the motor. Note that since the arrangement of the y-axis limit switch 691 is the same as that described above, a description thereof will be omitted.

The arrangements of the peripheral circuits of the MμCOM 1, e.g., the shake compensation circuit 14 and the operation switch section 3, will be described in detail next with reference to FIGS. 5A and 5B.

As shown in FIG. 5A, the operation switch section 3 is constituted by a main switch (MAIN-SW), a first release switch (1RSW), and a second release switch (2RSW). These switches are respectively connected to input terminals P-MAIN, P-1R, and P-2R. The MAIN-SW is a switch for controlling supply of power to the camera of this embodiment. The MAIN-SW is constituted by a duplex switch. When the MAIN-SW is turned on, power is supplied from a battery 80 to the system. The MμCOM 1 is then subjected to power on reset to start an operation. The MμCOM 1 immediately changes the level of a signal from an output terminal P-POWER from high level "H" to low level "L" to turn on a transistor Q1. With this operation, supply of power to the power supply line is ensured.

The 1RSW and the 2RSW are switches which are interlocked with the release button. When the release button (not shown) is depressed to the first-stroke position, the 1RSW is turned on. When the release button is depressed to the second-stroke position, the 2RSW is turned on. A gate circuit 81 is a circuit for outputting an interrupt signal to an input terminal P-INT. The interrupt signal is generated when either the 1RSW or the MAIN-SW is operated. The interrupt signal is used to make the MμCOM 1 leave the standby mode. Reference numeral 82 denotes an oscillator for outputting an operation clock for the MμCOM 1.

An external control signal is input from the external control terminal 22 to an input terminal P-TEST. When a signal from the terminal P-TEST is set at low level "L", the MμCOM 1 stops communicating operations with respect to the EEPROM 21 and the SμCOM 83. When communication from the external control terminal 22 to the SμCOM 83 or the EEPROM 21 is to be performed, a signal from a communication terminal TEST of the external control terminal 22 may be set at low level "L". This operation prevents a signal from the MμCOM 1 from colliding with a signal input from another terminal of the external control terminal 22. The EEPROM 21 serves to store correction data required for a photometric operation, a distance measuring operation, and the like performed by the MμCOM 1, and correction data required for a shake compensating operation performed by the SμCOM 83. The EEPROM 21 is wired to allow communication from the MμCOM 1 and the SμCOM 83.

Communication from the external control terminal 22 to the EEPROM 21 can also be performed. The correction data required for the MμCOM 1 and the SμCOM 83 therefore can be stored in the EEPROM 21 via the external control terminal 22. The EEPROM 21 can perform serial communication via three communication terminals CS, CLK, and DATA of the external control terminal 22. Since the EEPROM 21 of this type is widely used in cameras, a description thereof will be omitted.

An output terminal P-EN of the MμCOM 1 serves to inform the operation state of the MμCOM 1 to the SμCOM 83. If the release button is not operated for a predetermined period of time or more, the MμCOM 1 shifts to the standby mode. When the MμCOM 1 shifts to the standby mode, the MμCOM 1 changes the level of a signal from the terminal P-EN from low level "L" to high level "H". When the standby mode is canceled, the MμCOM 1 changes the level of a signal from the terminal P-EN from high level "H" to low level "L". The SμCOM 83 receives information indicating the state of the output terminal P-EN of the MμCOM 1 via an input port p-EN(INT).

The MμCOM 1 can communicate with the SμCOM 83 by using five communication terminals P-CS, P-RQ, P-CLK, P-DATA, and P-BUSY. These five communication terminals are respectively connected to terminals p-CS, p-RQ, p-CLK, p-DATA, and p-BUSY of the SμCOM 83 to form communication lines. These communication lines are also connected to the corresponding terminals of the external control terminal 22. The SμCOM 83 operates on the basis of control signals input through the communication lines. This communication method will be described in detail later.

The photointerruptor 75 generates a pulse signal upon rotation of the y-axis motor 76 of the shake compensation mechanism 15, and outputs the signal to an input terminal p-PIy of the SμCOM 83. The photointerruptor 52 generates a pulse signal upon rotation of the x-axis motor 50 of the shake compensation mechanism 15, and outputs the signal to an input terminal p-PIx of the SμCOM 83. The SμCOM 83 can detect the inclination angle of the parallel glass 64 from this pulse signal. That is, the SμCOM 83 can detect the amount by which an image is displaced by the parallel glass 64. The y-axis limit switch 691 and the x-axis limit switch 571 are limit switches (sw) for detecting the rotation limit of the parallel glass 64 (see FIG. 4). The two switches 691 and 571 are respectively wired to input terminals p-SWy and p-SWx of the SμCOM 83.

Output voltages from D/A converters 831 and 832 of the SμCOM 83 are respectively amplified by buffers 85 and 86. The amplified voltages are then respectively applied to a bridge constituted by transistors Q2 to Q5 and a bridge constituted by transistors Q6 to Q9. The rotational speeds of the motors 76 and 50 are controlled by the D/A converters 831 and 832.

The bridge constituted by the transistors Q2 to Q5 is connected to the y-axis motor 76. The rotating direction of the y-axis motor 76 is controlled by signals from output terminals p-My0 to p-My3 of the SµCOM 83. The bridge constituted by the transistors Q6 to Q9 is connected to the x-axis motor 50. The rotating direction of the x-axis motor 50 is controlled by signals from output terminals p-Mx0 to p-Mx3 of the SµCOM 83.

The shake amount of the shake compensation mechanism (gimbal mechanism) 15 with respect to the y-axis is detected by a y-axis shake detection circuit 87. The shake amount of the shake compensation mechanism 15 with respect to the x-axis is detected by an x-axis shake detection circuit 88. Note that each of the detection circuits is constituted by a vibration gyro to be described later. A transistor Q10 serves to control supply of power to the two detection circuits 87 and 88. The transistor Q10 can be ON/OFF-controlled by an output terminal p-sensor of the SµCOM 83.

Outputs from the detection circuits 87 and 88 are respectively input to A/D converters 833 and 834 of the SµCOM 83 via analog switches 89 to 92 (to be described later). The SµCOM 83 corrects the shake with respect to the y-axis by driving the y-axis motor 76 on the basis of the output from the A/D converter 833. The SµCOM 83 corrects the shake with respect to the x-axis by driving the x-axis motor 50 on the basis of the output from the A/D converter 834.

The analog switches 89 to 92 are connected to the input terminals of the A/D converters 833 and 834. The switches 91 and 92 are normally set in the ON state, and hence output signals from the x-axis shake detection circuit 88 are input to the A/D converters 833 and 834. When, however, a signal from a terminal EXT of the external control terminal 22 is set at low level "L", the switches 91 and 92 are turned off, and the switched 89 and 90 are turned on. Signals from terminals XDRV and YDRV of the external control terminal 22 are respectively input to the A/D converters 833 and 834. In order to execute a shake compensation testing operation, the camera must be vibrated to cause the shake detection circuits 87 and 88 to generate signals. With the use of the terminals EXT, XDRV, and YDRV of the external control terminal 22, however, a shake compensating operation can be performed without vibrating the camera. This is especially convenient when the response characteristics of the mechanism for driving the parallel glass 64 are to be measured. Conventionally, in order to measure the response characteristics, the camera must be placed on a vibrator to vibrate it. The response characteristics are then measured by changing the frequency and amplitude of vibrations of the vibrator. However, the vibrations which can be caused by the vibrator are limited. In contrast to this, according to the present invention, an electrical vibration signal can be easily generated. Reference numeral 84 denotes an oscillator required to generate an operation clock for the SµCOM 83.

Figure 5B:
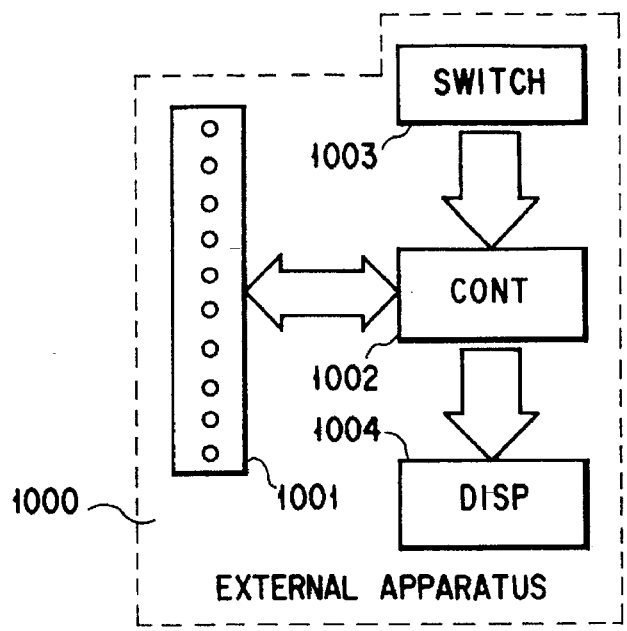

The portion enclosed within the broken line in FIG. 5B is an external apparatus 1000 which can be applied to the camera of this embodiment. This external apparatus 1000 includes at least a connector section 1001 to be connected to the external control terminal 22 on the camera body side as shown in FIG. 5A, a control means (CONT) 1002, an input means (SWITCH) 1003, and a display means (DISP) 1004. The control means 1002 has a program for performing two-way communication with the camera, and can control electrical components in the camera in accordance with an instruction from the input means 1003. The result obtained by performing camera control by means of the above communication is displayed on the display means 1004 of the external apparatus 1000, thereby allowing analysis of the function and performance of a function block associated with image blurring correction. As is apparent, the hardware of the external apparatus 1000 may be a general computer system.

Figure 6A:
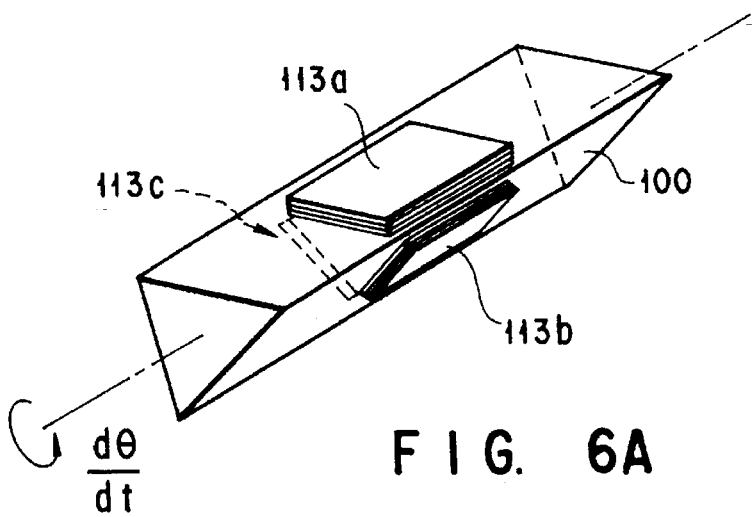
FIGS. 6A and 6B are views showing the arrangement of a vibration gyro using a vibrator in the form of a regular triangular prism.
Figure 6B:
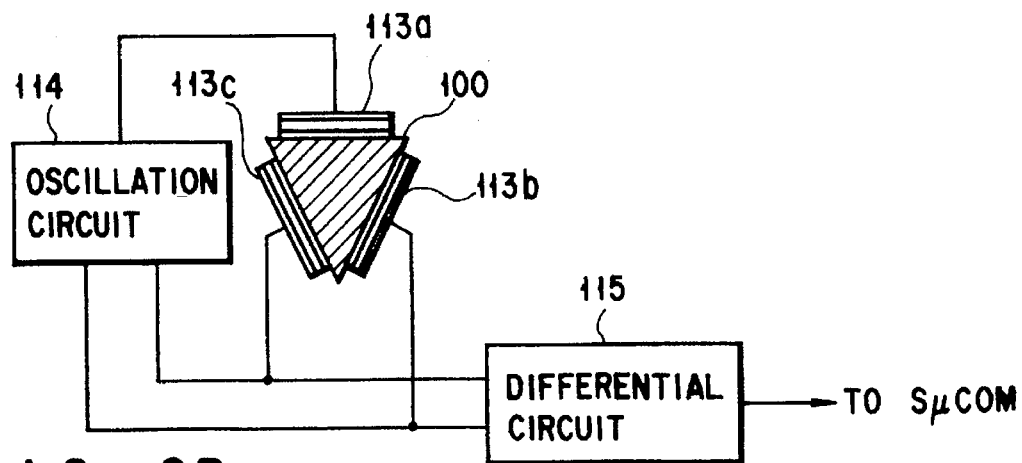

Detection circuits using vibration gyros will be described next as examples of the shake detection circuits 87 and 88. FIGS. 6A and 6B show the arrangement of a vibration gyro using a vibrator in the form of a regular triangular prism. As shown in FIG. 6A, a driving piezoelectric element 113a is formed on a side surface of a vibrator 100, and feedback piezoelectric elements 113b and 113c are respectively formed on the two remaining side surfaces.

As shown in FIG. 6B, an oscillation circuit 114 is connected between the feedback piezoelectric elements 113b and 113c and the driving piezoelectric element 113a so that outputs from the feedback piezoelectric elements 113b and 113c are fed back to the driving piezoelectric element 113a via the oscillation circuit 114. The vibrator 100 is, therefore, subjected to self-induced vibration. The difference in output voltage between the feedback piezoelectric elements 113b and 113c is proportional to an angular velocity $d\theta/dt$ of the vibrator 100, and is detected by a differential circuit 115.

FIGS. 7 to 10 are timing charts showing communication methods required to cause the SµCOM 83 to execute predetermined operations.

A communication method required to cause the SµCOM 83 to operate in an a mode will be described first with reference to FIG. 7. Upon detection of a change in the level of the input terminal p-RQ from high level "H" to low level "L", the SµCOM 83 is set in a state wherein command data can be received. The command data is output from the MµCOM 1 or the external control terminal 22 to the SµCOM 83 by a serial communication scheme. The SµCOM 83 receives the command data via the communication terminals p-CLK and p-DATA. A command a requests the SµCOM 83 to operate in the a mode. The a mode is an operation mode for centering the parallel glass 64. When a centering operation is executed, the parallel glass 64 is driven to a position where the glass 64 is perpendicular to the optical axis of the lens. Upon reception of the command a, the SµCOM 83 changes the output terminal p-BUSY from high level "H" to low level "L" to start the centering operation. When the centering operation is completed, the SµCOM 83 changes the level of a signal from the terminal p-BUSY from low level "L" to high level "H". When the signal from the terminal p-BUSY is set at high level "H", the MµCOM 1 or CONT 1002 changes the level of an input signal to the terminal p-RQ from low level "L" to high level "H". When the SµCOM 83 changes the level of the terminal p-RQ in this manner, the operation of the a mode is completed.

A communication method required to cause the SµCOM 83 to operate in a b mode will be described next with reference to FIG. 8. When a signal from the terminal p-RQ is set at low level "L", the SµCOM 83 receives command data (command b) from the MµCOM 1 or the external control terminal 22 via the terminals p-CLK and p-DATA of the SµCOM 83. Upon reception of the command b, the SµCOM 83 sets a signal from the terminal p-BUSY at low level "L" to execute a normal shake compensating operation. More specifically, the SµCOM 83 controls the y-axis motor 76 and the x-axis motor 50 on the basis of y- and x-axis shake signals set by the A/D converters 833 and 834. The shake compensating operation of the SµCOM 83 can be stopped by changing the level of the terminal p-RQ from low level "L" to high level "H". When the terminal p-RQ is set at high level "H", the SµCOM 83 stops the shake compensating operation and changes the level of the terminal p-BUSY from low level "L" to high level "H". When the level of the terminal p-BUSY of the SµCOM 83 is changed, the operation of the b mode is completed. The timing chart of FIG. 8 expresses three modes. That is, the communication methods in on c and b modes are the same as the communication method in the b mode. In the c mode, the SμCOM 83 executes only a shake compensating operation associated with the y-axis. That is, the SμCOM 83 controls the y-axis motor 76 on the basis of the y-axis shake signal set by the A/D converter 833. In the d mode, the SμCOM 83 executes only a shake compensating operation associated with the x-axis. That is, the SμCOM 83 controls the x-axis motor 50 on the basis of the x-axis shake signal set by the A/D converter 834.

The shake compensating operation in the b mode is executed during an exposure operation of the MμCOM 1. The shake compensating operations in the c and d modes, each of which is associated with only one axis, are used to test shake compensation. For example, the characteristics of x-axis shake compensation are measured by using the shake compensating operation in the b mode. In this case, theoretically, if the camera is vibrated in the x-axis direction, only the x-axis shake detection circuit 88 outputs a shake signal, and only the x-axis motor 50 is controlled. However, there is no guarantee that the detection axis of the y-axis shake detection circuit 87 is perfectly at a right angle to the x-axis. In addition, if the camera is vibrated in only the x-axis direction, a vibration component may be generated in the y-axis direction. Consequently, the characteristics of only shake compensation associated with the x-axis cannot be measured without being influenced by a y-axis shake compensating operation. For this reason, shake compensating operations in the c and d modes are required.

Figure 9:
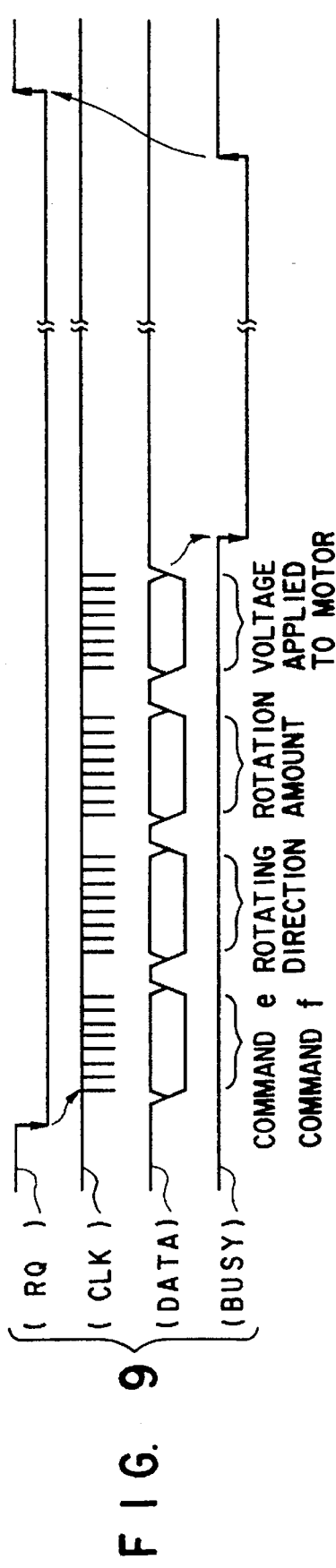
FIG. 9 is a timing chart for explaining a communication method of causing the SμCOM 83 in FIG. 5A to operate in an e mode and a f mode.

A communication method required to cause the SμCOM 83 to operate in an e mode will be described next with reference to FIG. 9. When the terminal p-RQ is set at low level "L", the SμCOM 83 receives command data (command e) from the MμCOM 1 or the external control terminal 22 via the terminals p-CLK and p-DATA of the SμCOM 83, together with data indicating the rotational amount and rotating direction of the y-axis motor 76 and a voltage to be applied thereto. The rotational amount of the y-axis motor 76 is represented by the number of pulse signals generated by the photointerruptor 75. Upon reception of these data, the SμCOM 83 sets a signal from the terminal p-BUSY at low level "L" to start rotating the y-axis motor 76. The SμCOM 83 drives the y-axis motor 76 in a designated direction until a designated number of pulse signals are received. When the SμCOM 83 finishes driving the y-axis motor 76, the SμCOM 83 changes the level of a signal from the terminal p-BUSY from low level "L" to high level "H". When a signal from the p-BUSY is set at high level "H", the CONT 1002 changes the level of an input signal to the terminal p-RQ from low level "L" to high level "H". When the level of the p-RQ changes in this manner, the operation of the e mode is completed. Note that since an operation of an f mode is equivalent to an operation of applying the operation of the e mode to the driving operation of the x-axis motor 50, the operation of the f mode can be expressed by the timing chart of FIG. 9.

Figure 10:
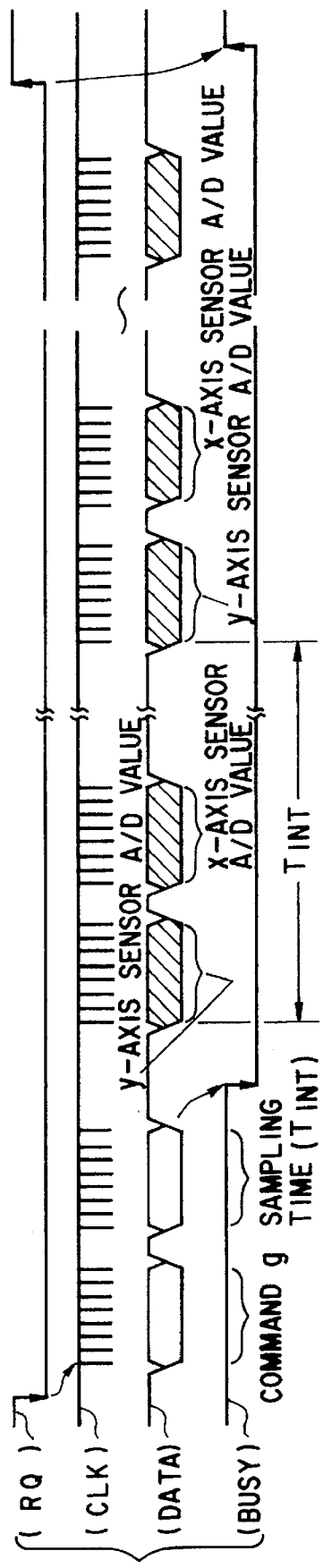
FIG. 10 is a timing chart for explaining a communication method of causing the SμCOM 83 in FIG. 5A to operate in a g mode.

A communication method required to cause the SμCOM 83 to execute a communicating operation in a g mode will be described next with reference to the timing chart shown in FIG. 10. When the p-RQ is set at low level "L", the SμCOM 83 receives command data (command g) from the MμCOM 1t or the external control terminal 22h via the terminals p-CLK and p-DATA of the SμCOM 83, together with data indicating the sampling time (TINT) of the A/D converter. Upon reception of these data, the SμCOM 83 sets a signal from the terminal p-BUSY at low level "L". The SμCOM 83 then outputs data changed by the A/D converters 833 and 834 via the terminals p-CLK and p-DATA. The hatched portions on the timing chart of FIG. 10 indicate data output from the SμCOM 83. The SμCOM 83 performs A/D conversion at intervals TINT. Therefore, data are output from the terminals p-CLK and p-DATA of the SμCOM 83 at the intervals TINT. The operation of the SμCOM 83 can be stopped by changing the level of the terminal p-RQ from low level "L" to high level "H". When a signal from the terminal p-RQ is set at high level "H", the SμCOM 83 stops outputting A/D conversion data, and changes the level of a signal from the terminal p-BUSY from low level "L" to high level "H". When the level of the terminal p-BUSY changes in this manner, the SμCOM 83 finishes the operation of the g mode.

The sequence of the main routine executed by the MμCOM 1 will be described next with reference to the flow chart of FIG. 11. When the user turns on the MAIN-SW, the MμCOM 1 is subjected to power on reset to start an operation. In step S1, the MμCOM 1 initializes the I/O ports and the memory. In step S2, the MμCOM 1 changes the level of a signal from the output terminal P-POWER from high level "H" to low level "L". With this operation, the transistor Q1 is turned on to ensure supply of power to the power supply line.

In step S3', the MμCOM 1 changes the level of a signal from the output terminal P-EN from high level "H" to low level "L". With this operation, the SμCOM 83 detects that the MμCOM 1 is in operation.

As described above, the SμCOM 83 is a microcomputer for detecting the shake amount of the camera and correcting image blurring (smear phenomenon) caused by the camera shake. The SμCOM 83 is started simultaneously with the MμCOM 1 when the MAIN-SW is turned on. If the signal from the p-EN is at high level "H", the SμCOM 83 determines that the MμCOM 1 is in the standby mode. The SμCOM 83 itself also shifts to the standby mode.

In step S3', the MμCOM 1 checks the state of the input terminal P-TEST. If the terminal P-TEST is at low level "L", the SμCOM 83 operates in accordance with a control signal input from the external control terminal 22. In this case, the MμCOM 1 must execute the test mode, and is inhibited from communicating with the SμCOM 83. Otherwise, a control signal output from the MμCOM 1 collides with a control signal from a communication terminal. If the signal from the terminal P-TEST is at low level "L", the MμCOM 1 shifts from step S3' to step S5. If the signal from the terminal P-TEST is at high level "H", the MμCOM 1 shifts from step S3' to step S4 to cause the SμCOM 83 to execute a centering operation. In this operation, communication of the a mode described with reference to FIG. 7 is performed. This centering operation must always be performed upon completion of a shake compensating operation.

According to the present invention, a centering operation is executed when the power switch of the camera is turned on because the parallel glass 64 may be shifted from the center of the rotation range when a shock inadvertently acts on the camera while the use is not using it.

If the 1RSW is not operated by the user for a predetermined period of time or more, the operation state automatically shifts to the standby mode to save the battery. During this standby mode, the parallel glass 64 may move upon reception of a shock. According to the present invention, in consideration of this point, a centering operation is also executed when the camera leaves the standby mode.

In steps S5 and S6, the MμCOM 1 initializes a timer counter and starts a count operation. This timer counter is set to overflow in, e.g., 30 sec. When the timer counter overflows, the MμCOM 1 shifts to the standby mode.

In step S7, the MμCOM 1 checks the state of MAIN-SW. When this MAIN-SW is turned off, the flow advances to step S7'. In step S7', the MμCOM 1 checks the state of the input terminal P-TEST. If a signal from the terminal P-TEST is at low level "L", the MμCOM 1 shifts to step S9 to continue the test mode. If the signal level of the terminal P-TEST is high level "H", the MμCOM 1 shifts to the step S8 to change the level of the output terminal P-POWER from low level "L" to high level "H". With this operation, the transistor Q1 is turned off, and the operations of the MμCOM 1 and the SμCOM 83 are stopped.

If it is determined in step S7 that the MAIN-SW is turned on, the MμCOM 1 shifts to step S9 to input the brightness information of an object to be photographed from the photometric processing circuit 5. The MμCOM 1 then calculates the f-number and shutter speed. In step S10, the MμCOM 1 displays these data by using the display circuit 2. In step S11, the MμCOM 1 checks the state of the 1RSW. When the release button is depressed to the first-stroke position, the 1RSW is turned on.

If it is determined in step S11 that the 1RSW is turned off, the MμCOM 1 shifts from step S11 to step S12 to check whether the timer counter has overflown. Note that if the user does not operate the release button for a predetermined period of time or more, the timer counter overflows. When the timer counter overflows, the MμCOM 1 shifts from step S12 to step S12'.

In step S12', the MμCOM 1 checks the state of the input terminal P-TEST. If a signal from the terminal P-TEST is at low level "L", the MμCOM 1 shifts to step S5 to continue the test mode. The MμCOM 1 then initializes the timer counter to inhibit a shift to the standby mode. If the signal from the terminal P-TEST is at high level "H", the MμCOM 1 shifts from step S12' to step S13.

In step S13, the MμCOM 1 changes the level of a signal from P-RQ from low level "L" to high level "H". With this operation, the SμCOM 83 detects that the MμCOM 1 is about to shift to the standby mode. The SμCOM 83 itself then shifts to the standby mode.

In step S14, the MμCOM 1 permits interruption. When the MAIN-SW or the 1RSW is operated, an interrupt signal is input to the input terminal INT of the MμCOM 1. In step S15, the MμCOM 1 stops the oscillating operation of the oscillator 82 and shifts to the standby mode (step S16). Note that this standby mode can be canceled by an interrupt signal.

When the standby mode is canceled, the oscillator 82 starts an oscillating operation. The MμCOM 1 starts operating from step S3. Note that if it is determined in step S12 that the timer counter has not overflown, the MμCOM 1 shifts to step S7.

If it is determined in step S11 that the 1RSW is turned on, the MμCOM 1 shifts from step S11 to step S11'. In step S11', the MμCOM 1 calculates the defocus amount on the basis of data output from the focus detection section 13. The MμCOM 1 then moves the photographing lens 20 in accordance with the defocus amount. In step S17, the MμCOM 1 checks the state of the 2RSW. When the release button is depressed to the second-stroke position, the 1RSW and the 2RSW are turned on.

If it is determined in step S17 that the 2RSW is turned off, it indicates that only the 1RSW is turned on. In this case, the MμCOM 1 shifts from step S17 to step S5 to initialize the timer counter. With this operation, the MμCOM 1 does not shift to the standby mode. If it is determined in step S17 that the 2RSW is turned on, the MμCOM 1 shifts to step S18 to execute a subroutine "exposure" to be described later. As a result, an exposure operation with respect to the film is executed, and image blurring correction is executed by the SμCOM 83. Upon completion of the subroutine, the flow shifts to step S3' to perform the above-described centering operation.

Figure 12:
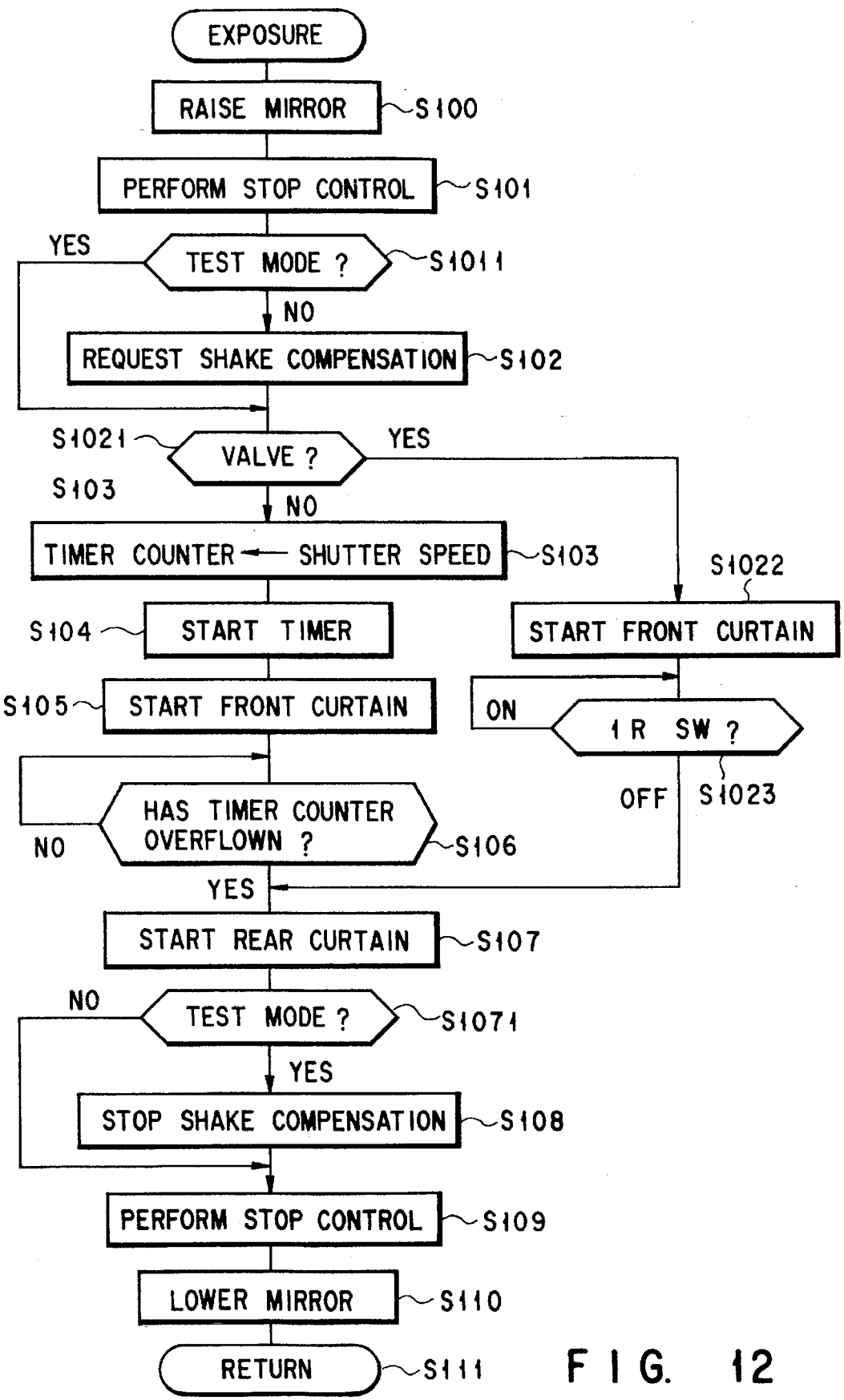
FIG. 12 is a flow chart showing the sequence of a subroutine "exposure" in FIG. 11.

The sequence of the subroutine "exposure" will be described next with reference to the flow chart of FIG. 12. The MμCOM 1 controls the mirror control section 7 to raise the quick return mirror 8 (step S100), and controls the stop control section 16 to set the stop 17 to a predetermined value (step S101). The MμCOM 1 then checks the state of the input terminal P-TEST (step S1011). If a signal from the terminal P-TEST is at low level "L", and the test mode is set, the MμCOM 1 shifts from step S1011 to step S102 to communicate with the SμCOM 83 to cause it to execute image blurring correction during an exposure operation. In order to cause the SμCOM 83 to execute image blurring correction, communication must be performed in the b mode in FIG. 8. That is, the MμCOM 1 changes the output terminal P-RQ from high level "H" to low level "L", and outputs the command b from the terminals P-CLK and P-DATA (step S102).

If it is determined in step S1011 that the signal from the terminal P-TEST is at high level "H", the MμCOM 1 shifts from step S1011 to step S1021 to inhibit image blurring correction. In step S1021, the MμCOM 1 checks whether the valve mode is set. If it is determined in step S1021 that the valve mode is set, the camera must continue the exposure operation while the release button is depressed. More specifically, when the flow shifts from step S1021 to step S1022, the MμCOM 1 controls the shutter control section 11 to drive the front curtain of the focal plane shutter 12. With this operation, an exposure operation with respect to the film is started. In step S1023, the MμCOM 1 waits until the 1RSW is turned off. When the 1RSW is turned off, the MμCOM 1 shifts to step S107 to drive the rear curtain of the focal plane shutter 12. With this operation, the exposure operation is completed.

If it is determined in step S1021 that the valve mode is not set, the MμCOM 1 shifts from step S1021 to step S103. The MμCOM 1 then initializes the timer counter in accordance with the shutter speed (step S103), starts the timer counter (step S104), and drives the front curtain of the focal plane shutter 12 (step S105). With this operation, an exposure operation with respect to the film is started, and this exposure operation is executed until the timer counter overflows. The overflow of this timer counter is detected in step S106. When the timer counter overflows, the MμCOM 1 shifts from step S106 to step S107 to complete the exposure operation.

Subsequently, the MμCOM 1 checks whether the test mode is set (step S1071). If it is determined that the test mode is set, the flow shifts from step S1071 to step S108 to change the terminal P-RQ from low level "L" to high level "H" so as to stop the image blurring correction performed by the SμCOM 83 (step S108). With this operation, the communication in the b mode is completed.

If it is determined in step S1071 that the test mode is not set, the MμCOM 1 shifts from step S1071 to step S109 to control the stop control section 16 to set the stop 17 to the full-aperture f-number. The MμCOM 1 controls the stop control section 16 in this manner to return the quick return mirror 8 into the optical path (step S110), and terminates the sequence. The flow then returns to the main sequence (step S111).

Figure 13:
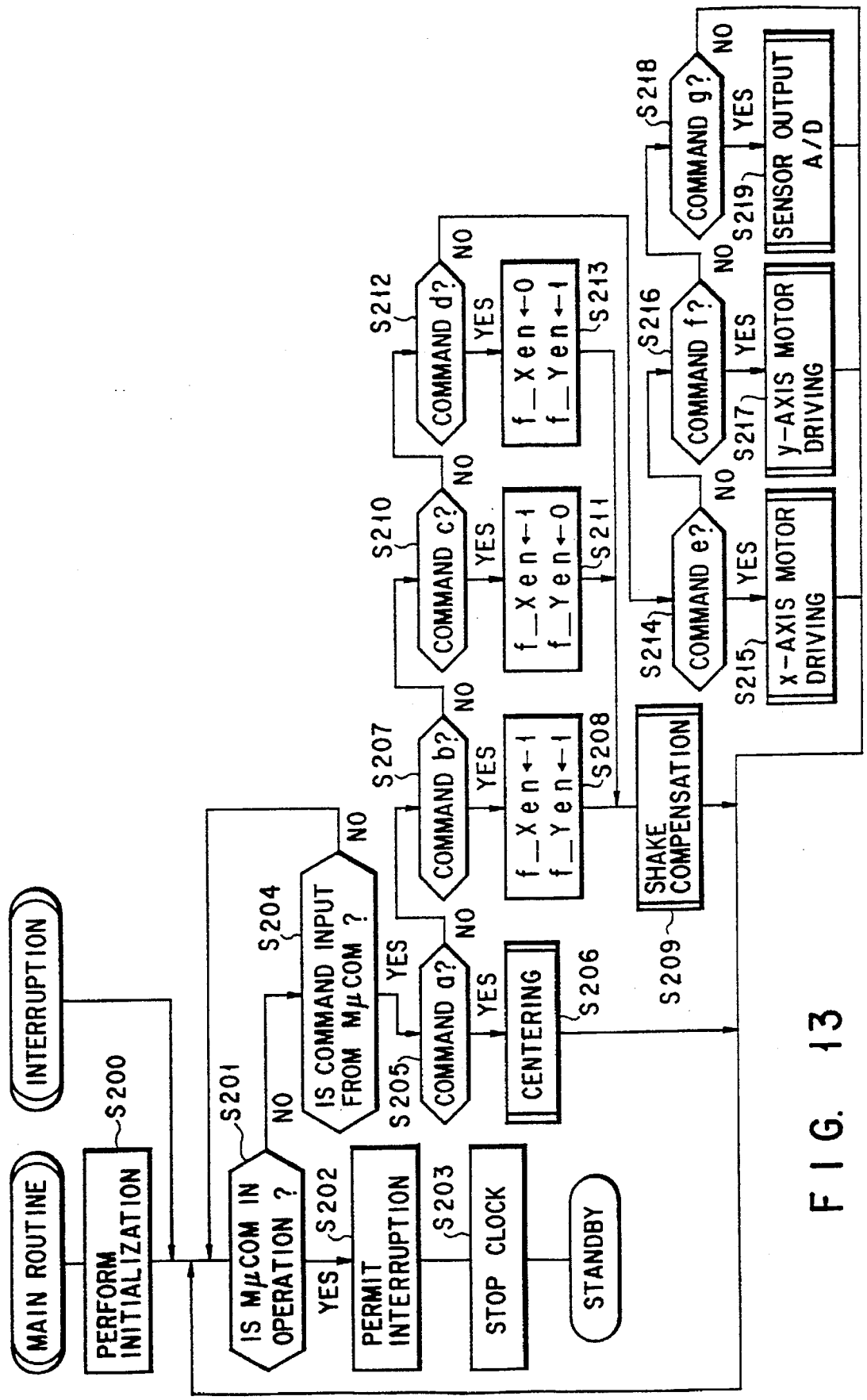
FIG. 13 is a flow chart showing the main routine executed by the SμCOM 83 in FIG. 5A.

The main routine of the SµCOM 83 will be described next with reference to the flow chart of FIG. 13. When the user turns on the MAIN-SW, power is supplied to the camera system, and the SµCOM 83 also starts operating, similar to the MµCOM 1.

First of all, the SµCOM 83 initializes the I/O ports, the memory, and the like (step S200). The SµCOM 83 then checks the operation state of the MµCOM 1 (step S201). The MµCOM 1 is set in the standby mode if the release button is not operated for a predetermined period of time. At this time, the MµCOM 1 changes the output port P-EN from low level "L" to high level "H". In step S201, the SµCOM 83 detects such a change to determine the operation state of the MµCOM 1.

Upon detecting that the MµCOM 1 has shifted to the standby mode, the SµCOM 83 shifts from step S201 to step S202 to permit interruption (step S202). This interrupt signal is generated when the MµCOM 1 changes a signal from the port P-EN from high level "H" to low level "L".

The SµCOM 83 leaves the standby mode in response to this interrupt signal, and starts operating from step S201. In step S203, the SµCOM 83 stops the oscillating operation of the oscillator 84 and shifts to the standby mode.

If it is determined in step S201 that the MµCOM 1 is in operation, the SµCOM 83 shifts to step S204. In step S204, the SµCOM 83 checks the state of the input terminal P-RQ. If the terminal P-RQ has changed from high level "H" to low level "L", the SµCOM 83 receives a command from the MµCOM 1 or the external control terminal 22 via the terminals p-CLK and p-DATA. If the terminal p-RQ has not changed, the SµCOM 83 shifts step S204 to step S201.

Upon reception of the command a from the MµCOM 1, the SµCOM 83 must execute an operation in the a mode. In the a mode, the SµCOM 83 must execute a centering operation. The SµCOM 83 shifts from step S205 to step S206 to execute a subroutine "centering" to be described later.

Upon reception of the command b from the MµCOM 1, the SµCOM 83 shifts from step S207 to step S208 to execute an operation in the b mode. In the b mode, the SµCOM 83 controls image blurring correction with respect to the x-axis and the y-axis. For this purpose, the SµCOM 83 sets necessary flags before executing the subroutine "shake compensation" to be described later. That is, the SµCOM 83 sets an x-axis image blurring correction permission flag (f-Xen) and a y-axis image blurring correction permission flag (y-Yen). In step S209, the SµCOM 83 executes the subroutine "shake compensation".

Upon reception of the command c from the MµCOM 1, the SµCOM 83 shifts from step S210 to step S211 to execute an operation in the c mode. At this time, the SµCOM 83 sets the flag f-Xen and resets the flag f-Yen to execute image blurring correction only with respect to the x-axis, and shifts to step S209.

Upon reception of a command d from the MµCOM 1, the SµCOM 83 shifts from step S212 to step S213 to execute an operation in the d mode. At this time, the SµCOM 83 sets the flag f-Yen and resets the flag f-Xen to execute image blurring correction only with respect to the y-axis, and shifts to step S209.

Upon reception of the command g from the MµCOM 1, the SµCOM 83 shifts from step S214 to step S215 to execute an operation in the g mode. In step S215, the SµCOM 83 executes a subroutine "x-axis motor driving" to be described later. In this subroutine, the x-axis motor 50 is controlled on the basis of driving conditions input from the MµCOM 1.

Upon reception of a command f from the MµCOM 1, the SµCOM 83 shifts from step S216 to step S217 to execute an operation in the f mode. In step S217, the SµCOM 83 executes a subroutine "y-axis motor driving" to be described later. In this subroutine, the y-axis motor 76 is controlled on the basis of driving conditions input from the MµCOM 1.

Upon reception of the command g from the MµCOM 1, the SµCOM 83 shifts from step S218 to step S219 to execute an operation in the g mode. In step S219, the SµCOM 83 executes a subroutine "sensor output A/D" to be described later. In this subroutine, the SµCOM 83 A/D-converts outputs from the x- and y-axis shake detection circuits 88 and 87, and outputs the conversion values from the terminals p-CLK and p-DATA. When the operation in each mode is completed, the SµCOM 83 shifts to step S201 to receive the next command.

Figure 14:
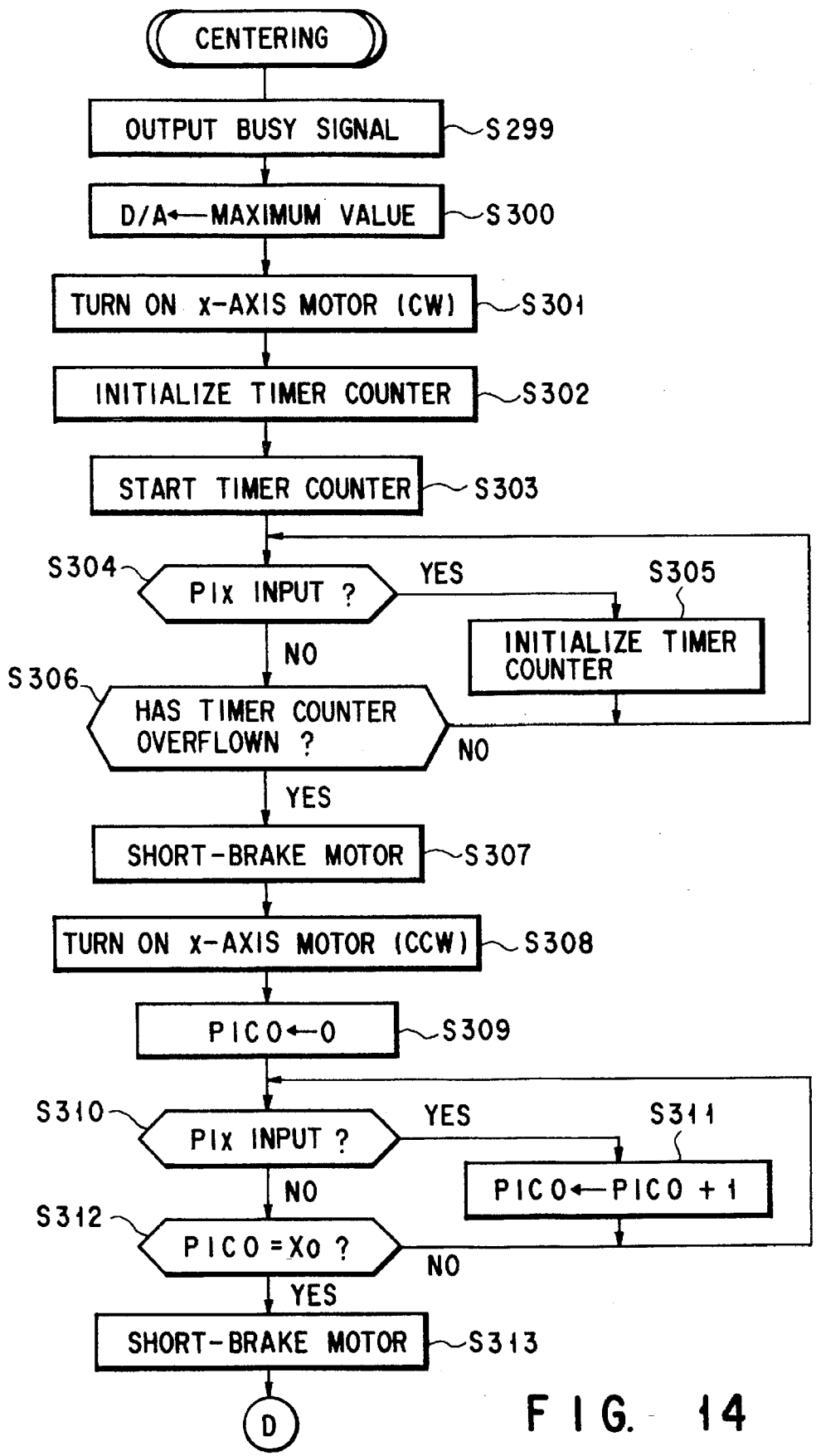
FIG. 14 is a flow chart showing the sequence of a subroutine "centering" in FIG. 13.
Figure 15:
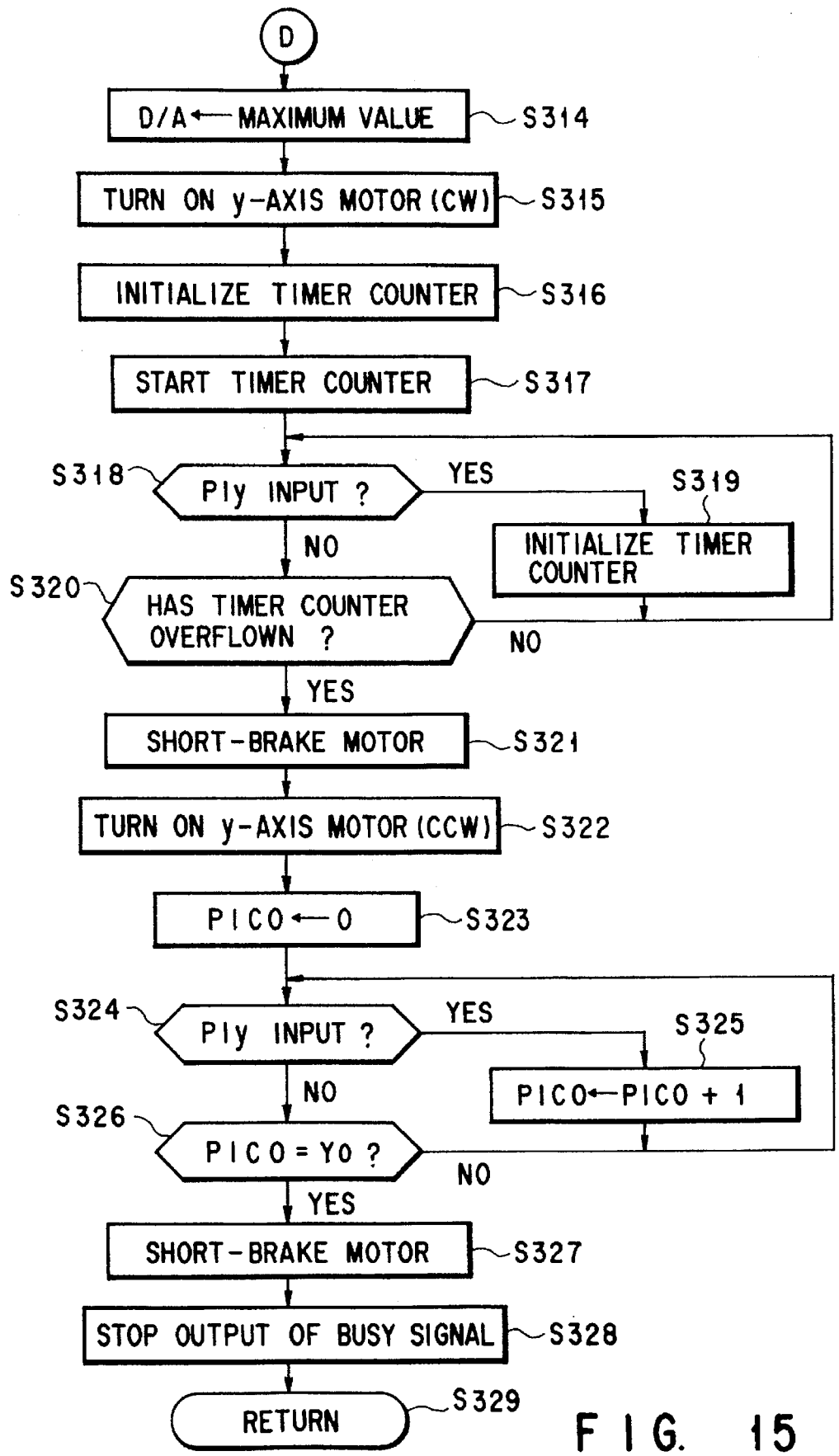
FIG. 15 is a flow chart showing the sequence of the subroutine "centering" in FIG. 13.

The sequence of the subroutine "centering" executed by the SµCOM 83 will be described next with reference to the flow charts of FIGS. 14 and 15.

In step S299, the SµCOM 83 changes the level of the output terminal p-BUSY from high level "H" to low level "L". A low-level signal is kept output from the terminal p-BUSY during a centering operation. The MµCOM 1 detects from the input signal via the terminal P-BUSY that the SµCOM 83 is in operation.

In this subroutine, the parallel glass 64 is set in the center of its rotation range. With this operation, the optical axis of the photographing lens becomes perpendicular to a glass surface. First of all, the SµCOM 83 sets the maximum value in the D/A converter 831 for determining the driving speed of the x-axis motor 50 (step S300), and outputs signals for rotating the x-axis motor 50 in the clockwise direction (CW) from the terminals p-Mx0 to p-Mx3 (step S301). After initializing the timer counter, the SµCOM 83 starts a count operation (steps S302 and S303). This timer counter is used to determine whether the parallel glass 64 is rotated to the limit of the rotation range.

Subsequently, on the basis of a pulse signal output from the photointerruptor 52 and input to the input terminal p-PIx, the SµCOM 83 checks whether the parallel glass 64 is rotated to the limit of the rotation range (steps S304 to S306).

If the x-axis motor 50 is rotated to the limit, pulse signal is input from the photointerruptor 52. In step S305, therefore, the timer counter is initialized again. For this reason, no overflow occurs.

If the parallel glass 64 reaches the limit, the x-axis motor 50 is stopped, and no further pulse signal is generated by the photointerruptor 52.

When the count operation of the timer counter progresses to cause an overflow, the SµCOM 83 shifts from step S306 to step S307. The SµCOM 83 outputs signals for short-braking the x-axis motor 50 from the terminals p-Mx0 to p-Mx3 (step S307).

The next necessary operation is to rotate the parallel glass 64 to the middle position in the rotation range with reference to the limit. First of all, the SµCOM 83 outputs signals for rotating the x-axis motor 50 in the counterclockwise (CCW) to the terminals p-Mx0 to p-Mx3 (step S308), and detects the rotation amount of the parallel glass 64 (steps S309 to S312). That is, the SµCOM 83 short-brakes the x-axis motor 50 when a value PIC0, which is incremented every time a pulse signal is input to the input terminal p-PIx, coincides with a value XO (step S313). Note that this value XO is a value obtained by converting the rotation amount of the parallel glass 64 which corresponds to the rotation from the limit to the middle position of the rotation range into the number of pulses from the photointerruptor 75. When the SμCOM 83 executes the above processing (steps S300 to S313), the centering operation associated with the x-axis is completed.

Note that a centering operation associated with the y-axis is also performed (steps S314 to S327). Since this operation is similar to the operation associated with the x-axis (steps S300 to S313), a description thereof will be omitted.

In step S328, the SμCOM 83 changes the level of the terminal p-BUSY from low level "L" to high level "H". With this operation, the subroutine "centering" executed by the SμCOM 83 is completed.

Figure 16:
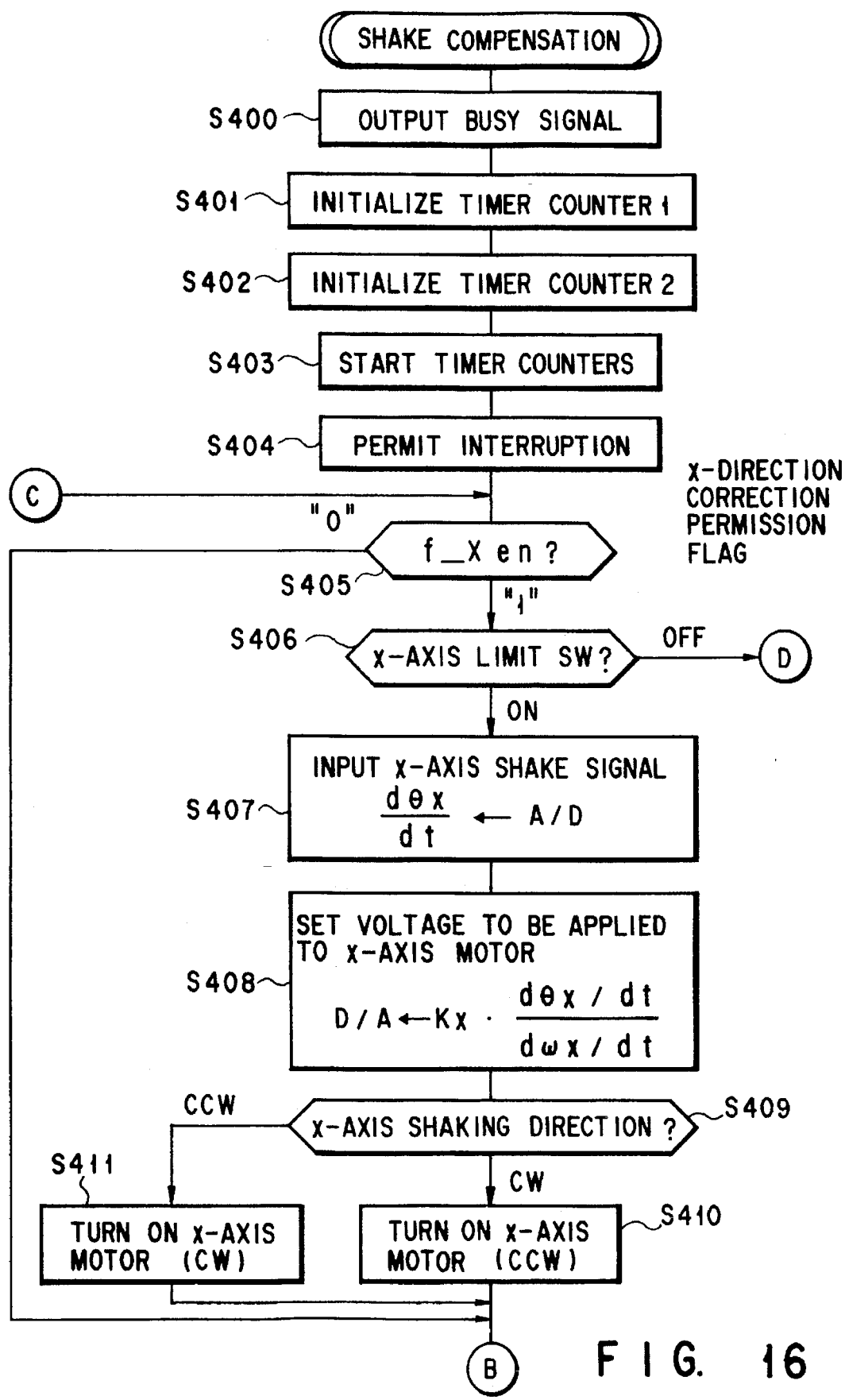
FIG. 16 is a flow chart showing the sequence of a subroutine "shake compensation" in FIG. 13.
Figure 17:
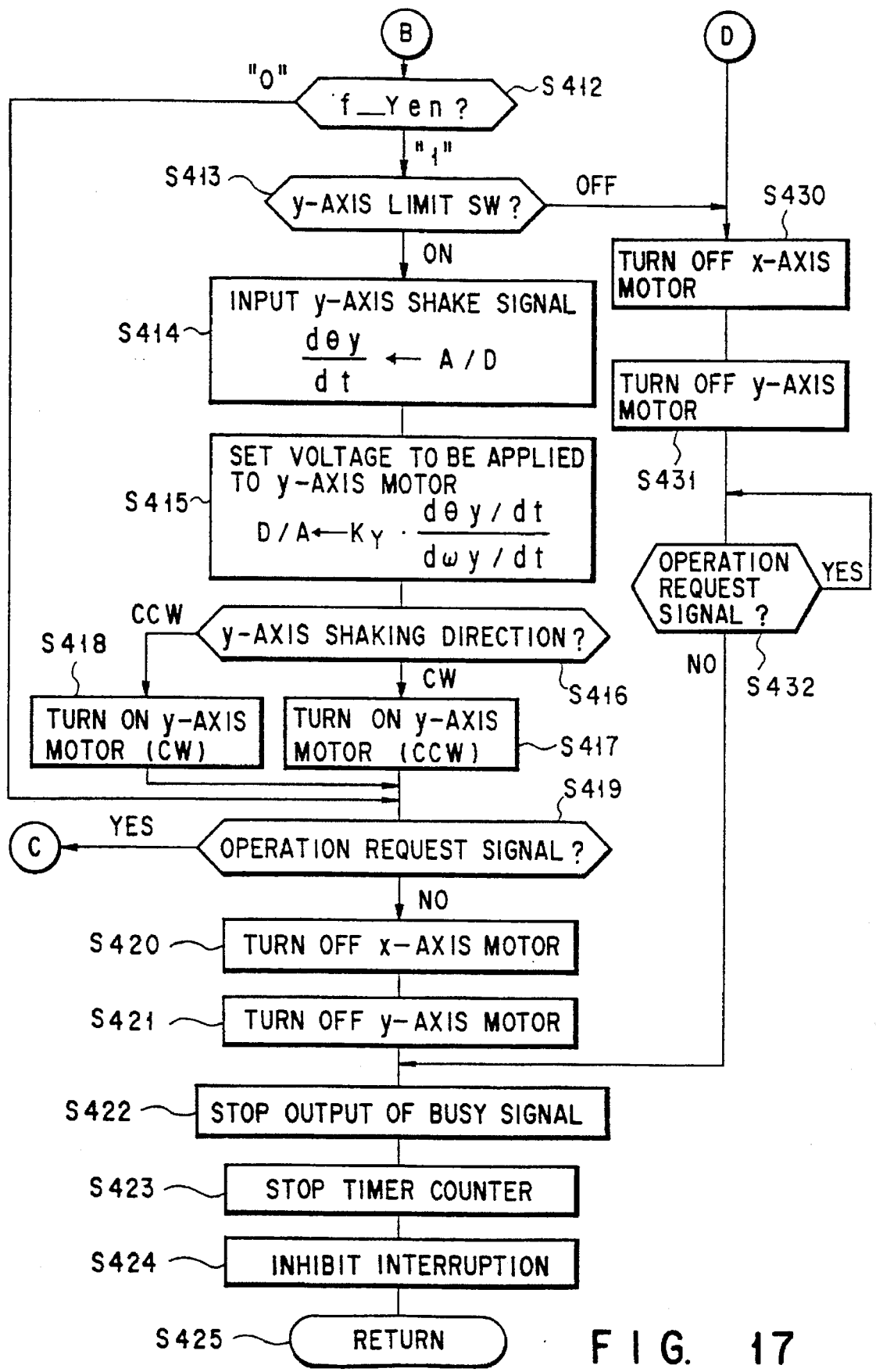
FIG. 17 is a flow chart showing the sequence of the subroutine "shake compensation" in FIG. 13.

The sequence of the subroutine "shake compensation" executed by the SμCOM 83 will be described next with reference to the flow charts of FIGS. 16 and 17. The SμCOM 83 changes the signal level of the output terminal p-BUSY from high level "H" to low level "L" (step S400), initializes timer counter 1 and timer counter 2, and starts count operations (steps S401 to S403). Timer counter 1 is used to detect the rotational speed of the x-axis motor 50. To detect the rotational speed of the x-axis motor 50 is to detect the rotational speed of the parallel glass 64 with respect to the x-axis of the gimbal mechanism 15. The rotational speed of the x-axis motor 50 can be detected by measuring the interval of pulse signals output from the photointerruptor (PIx) 52 connected to the motor 50 using timer counter 1. The interval of pulse signals is measured by using interrupt processing. FIGS. 18A and 18B are flow charts showing interrupt processing. In this processing, the rotational speed of the x-axis motor 50 is detected. The rotational speed of the y-axis motor 76 is detected by timer counter 2. This detection method is the same as that for the x-axis motor 50. These methods will be described in detail later.

The SμCOM 83 permits an interrupt operation (step S404). This interrupt processing is executed when a pulse signal from the photointerruptor (PIx) 52 (or PIy 75) is input to the input terminal p-PIx (or p-PIy) of the SμCOM 83.

The SμCOM 83 checks the state of the x-axis image blurring correction permission flag (f-Xen) (step S405). If the flag f-Xen is at "0", the SμCOM 83 must inhibit driving of the x-axis motor 50. The SμCOM 83, therefore, shifts from step S405 to step S412.

If the flag f-Xen is at "1", the SμCOM 83 shifts from step S405 to step S406. In step S406, the SμCOM 83 checks the state of the x-axis limit switch (SW) 571. This switch 571 changes from the ON state to the OFF state when the parallel glass 64 reaches the limit of the x-axis rotation range. FIG. 3 shows the arrangement of the switch 571. The state of the switch 571 can be detected on the basis of an input to the input terminal p-SWx of the SμCOM 83. If the signal level of the terminal p-SWx is at high level "H", it indicates that the parallel glass 64 has reached the limit of the rotation range. In this case, a shake compensating operation must be inhibited. For this purpose, the SμCOM 83 shifts from step S406 to step S430. In steps S430 and S431, the SμCOM 83 stops supply of power to the x-axis motor 50 and the y-axis motor 76. In step S432, the SμCOM 83 waits until no operation request signal is output from the MμCOM 1. That is, the SμCOM 83 waits in step S432 until the level of the input terminal p-RQ changes from low level "L" to high level "H". When the signal level of the terminal p-RQ is set at high level "H", the SμCOM 83 shifts to step S422. If it is determined in step S406 that the signal level of the terminal p-SWx is at low level "L", the SμCOM 83 shifts to step S407.

In step S407, the SμCOM 83 receives an output from the x-axis shake detection circuit 88 via the A/D converter 834. The output from the D/A converter 832 A/D converter 834 represents the angular velocity (dθx/dt) based on a shake with respect to the x-axis.

In step S408, the SμCOM 83 sets data in the D/A converter 832 to set the rotational speed of the x-axis motor 50. This data is calculated by (dωx/dt)/(dθx/dt)·Kx where dωx/dt is the rotational speed of the x-axis motor 50, which is calculated in an interrupt routine to be described later, and Kx is a constant, which is determined in consideration of the reduction ratio of the gears mounted on the x-axis motor 50, the optical characteristics of the parallel glass 64, and the output characteristics of the x-axis shake detection circuit 88.

In step S409, the SμCOM 83 detects the rotating direction of the camera with respect to the x-axis upon occurrence of a camera shake on the basis of an output from the x-axis shake detection circuit 88. If the rotating direction is CCW, the SμCOM 83 shifts to step S411 to rotate the x-axis motor 50 in the rotating direction CW. With this operation, the movement of the image due to the rotation of the camera is canceled out by the movement of the image due to the rotation of the parallel glass 64, image blurring on the film is corrected.

If the rotating direction of the camera upon occurrence of a camera shake is the rotating direction CW, the SμCOM 83 shifts from step S409 to step S410 to rotate the x-axis motor 50 in the rotating direction CCW. Note that the rotating direction of the x-axis motor 50 can be controlled by signals from the output terminals p-Mx0 to p-Mx3 of the SμCOM 83.

In step S412, the SμCOM 83 checks the state of the y-axis image blurring correction permission flag (f-Yen). If the flag f-Yen is at "0", the SμCOM 83 must inhibit driving of the y-axis motor 76. The SμCOM 83, therefore, shifts from step S412 to step S419. If the flag f-Yen is at "1", the SμCOM 83 shifts from step S412 to step S413. Steps S413 to S418 are included in a control routine for the y-axis motor 76. 10 Since this control method is the same as that for the x-axis motor 50 in steps S407 to S411, a description thereof will be omitted (steps S408 to S418). The SμCOM 83 alternately executes image blurring correction associated with the x-axis and the y-axis in a time-divisional manner. This operation must be performed at a sufficiently high speed with respect to the shake signal period. Image blurring correction is basically continued as long as an operation request signal is input to the terminal p-RQ of the SμCOM 83. The presence/absence of this operation request signal is determined in step S419. If a signal from the terminal P-RQ of the MμCOM 1 is at low level "L", image blurring correction performed by the SμCOM 83 is continued. The SμCOM 83 then shifts from step S419 to step S405. When the signal from the terminal p-RQ changes from low level "L" to high level "H", the SμCOM 83 shifts from step S419 to step S420. In steps S420 and S421, the SμCOM 83 stops the rotation of the x- and y-axis motors 50 and 76.

In step S422, the SμCOM 83 changes the level of a signal from the terminal p-BUSY from low level "L" to high level "H". In step S423, the SμCOM 83 stops the operations of timer counters 1 and 2. In step S424, the SμCOM 83 inhibits an interrupt operation, and terminates all the sequences. The flow then returns to the main sequence.

The flow chart of FIG. 18A shows the sequence of an interrupt routine to be executed when a pulse signal from the photointerruptor (PIx) 52 is input to the terminal p-PIx of the SμCOM 83. More specifically, in step S501, the SμCOM 83 stores the count value of timer counter 1 as a value TA. This value TΔ represents the interval of pulses from the photointerruptor (PIx) 52. In steps S502 and S503, the SμCOM 83 initializes timer counter 1 and starts a count operation. In step S504, the SμCOM 83 calculates the rotational speed (dωx/dt) of the x-axis motor 50 from the interval (TΔ) of pulses from the photointerruptor (PIx) 52 and a coefficient (kx). This coefficient kx is determined by the number of slits of the disk 51 connected to the motor 50.

The flow chart of FIG. 18B shows the sequence of an interrupt routine to be executed when a pulse signal from the photointerruptor (PIy) 75 is input to the terminal p-PIy of the SμCOM 83. More specifically, in step S510, the SμCOM 83 stores the count value of timer counter 2 as a value TΔ. This value TΔ represents the interval of pulses from the photointerruptor (PIy) 75. In steps S511 and S512, the SμCOM 83 initializes timer counter 2 and starts a count operation. In step S513, the SμCOM 83 calculates the rotational speed (dωx/dt) of the y-axis motor 76 from the interval (TΔ) of pulses from the photointerruptor (PIy) 75 and a coefficient (ky). This coefficient ky is determined by the number of slits of the disk 74 connected to the motor 76.

Figure 19:
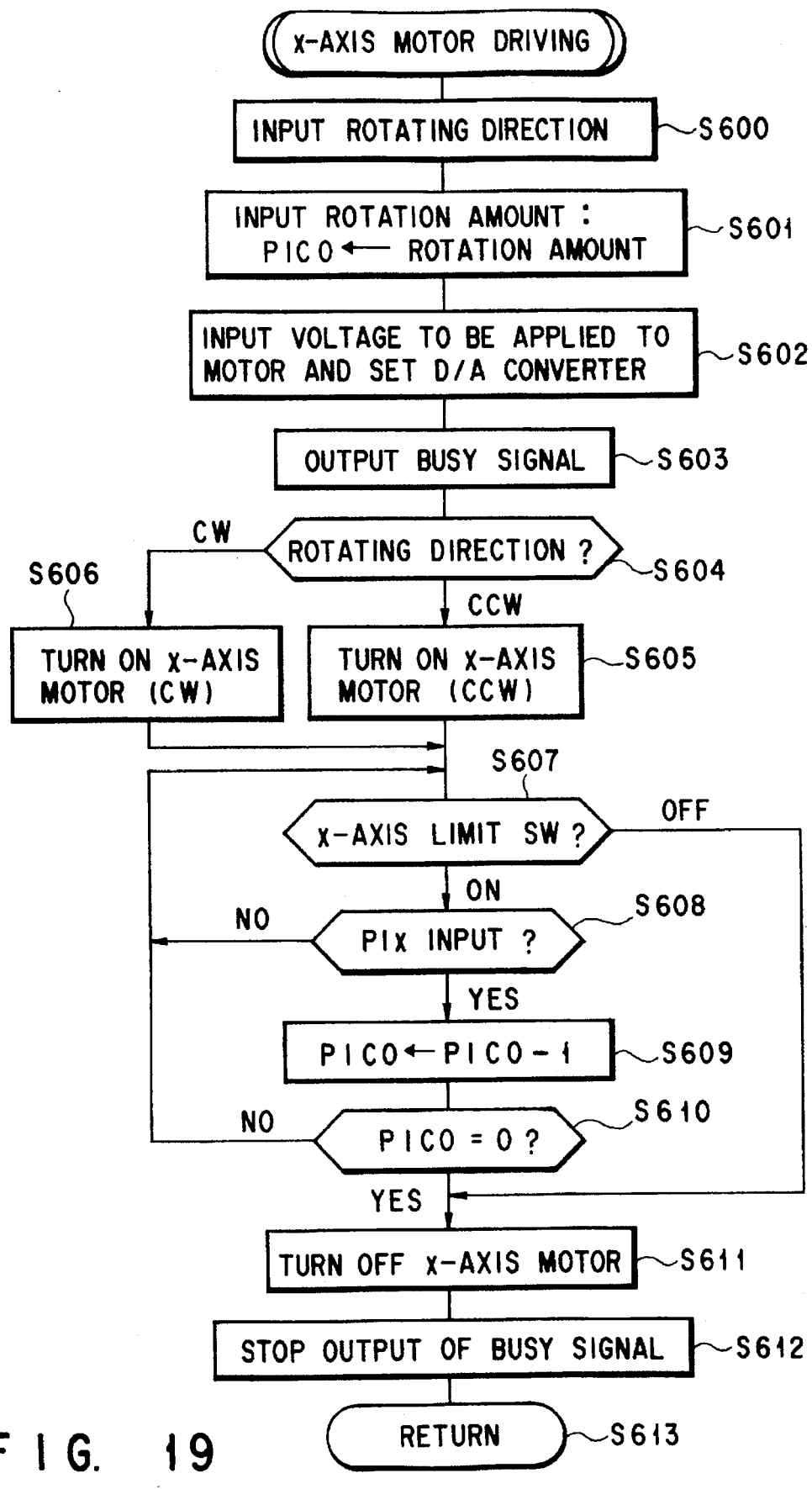
FIG. 19 is a flow chart showing the sequence of a subroutine "x-axis motor driving" in FIG. 13.

The sequence of the subroutine "x-axis motor driving" executed by the SμCOM 83 will be described next with reference to the flow chart of FIG. 19. The SμCOM 83 receives data indicating the rotating direction of the x-axis motor 50 via the terminals p-CLK and p-DATA (step S600), and also receives data indicating the rotation amount of the x-axis motor 50 via the terminals p-CLK and p-DATA (step S601). This rotation amount corresponds to the number of pulses generated by the photointerruptor (PIx) 52. The SμCOM 83 sets this data as the value PIC0. The SμCOM 83 then receives data indicating the voltage to be applied to the x-axis motor 50 via the terminals p-CLK and p-DATA.

This data is set in the D/A converter 832 (step S602). The SμCOM 83 changes the output terminal p-BUSY from high level "H" to low level "L". The SμCOM 83 keeps outputting a low-level signal from the terminal p-BUSY while the x-axis motor 50 is in operation. The MμCOM 1 detects from a signal from the terminal P-BUSY that the SμCOM 83 is in operation (step S603).

The SμCOM 83 then determines the rotating direction of the x-axis motor 50 (step S604). If the data indicating the rotating direction, which is output from the MμCOM 1, indicates the direction CCW, the SμCOM 83 shifts to step S605 to set the terminals p-Mx0 to p-Mx3 to rotate the x-axis motor 50 in the CCW direction. When the data indicating the rotating direction, which is output from the MμCOM 1, indicates the direction CW, the SμCOM 83 shifts to step S606 to rotate the x-axis motor 50 in the direction CW (steps S605 and S606).

The SμCOM 83 checks the state of the x-axis limit switch 571 (step S607). This x-axis limit switch 571 is a switch which changes from the ON state to the OFF state when the parallel glass 64 reaches the limit of the rotation range. The state of this limit switch 571 can be detected on the basis of the level of an input to the input terminal p-SWx of the SμCOM 83. If the signal level of the terminal p-SWx is at high level "H", it indicates that the parallel glass 64 has reached the limit of the rotation range. In this case, the SμCOM 83 must stop supply of power to the x-axis motor 50. The SμCOM 83 then shifts from step S607 to step S611. If the limit switch (SW) 571 is turned on, the SμCOM 83 shifts from step S607 to step S608.

Subsequently, the SμCOM 83 checks whether a pulse signal generated by the PIx 52 is input to the input terminal p-PIx (step S608). If the pulse signal is not input, the SμCOM 83 shifts to step S607. If the pulse is input, the SμCOM 83 shifts from step S608 to step S609 to decrement the value PIC0 (step S609). The SμCOM 83 checks whether the value PIC0 is 0 (step S610). If the value PIC0 is not 0, the SμCOM 83 must keep rotating the x-axis motor 50. The SμCOM 83, therefore, shifts to step S607. If the value PIC0 is 0, the SμCOM 83 shifts to step S611 to stop the rotation of the x-axis motor 50. The SμCOM 83 also changes the terminal p-BUSY from low level "L" to high level "H". With this operation, the subroutine "x-axis motor driving" executed by the SμCOM 83 is completed (steps S612 and S613).

Figure 20:
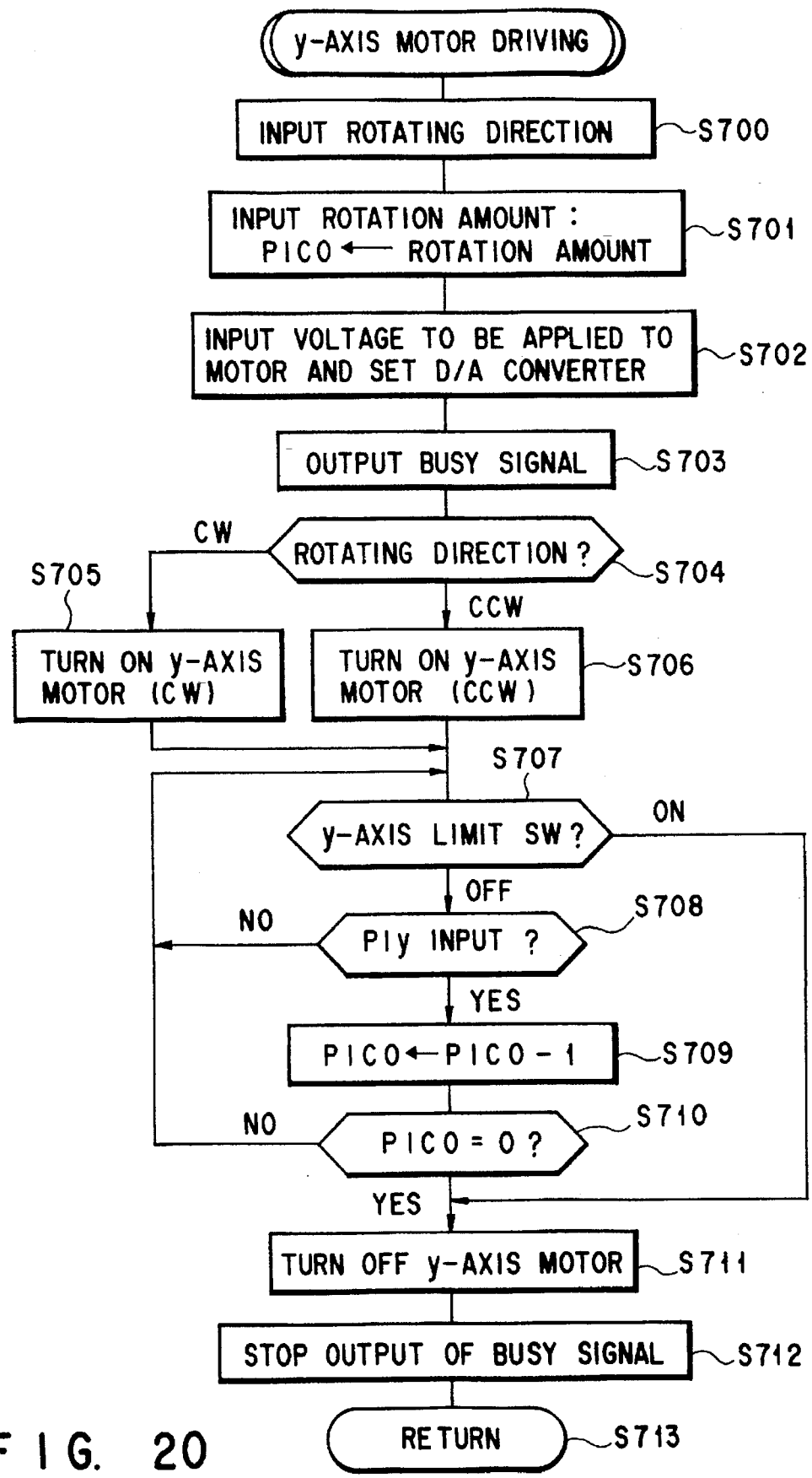
FIG. 20 is a flow chart showing the sequence of a subroutine "y-axis motor driving" in FIG. 13.

The flow chart of FIG. 20 shows the sequence of the subroutine "y-axis motor driving". Since the y-axis motor 76 is controlled by the same control method as that for the x-axis motor 50, a description thereof will be omitted.

Figure 21:
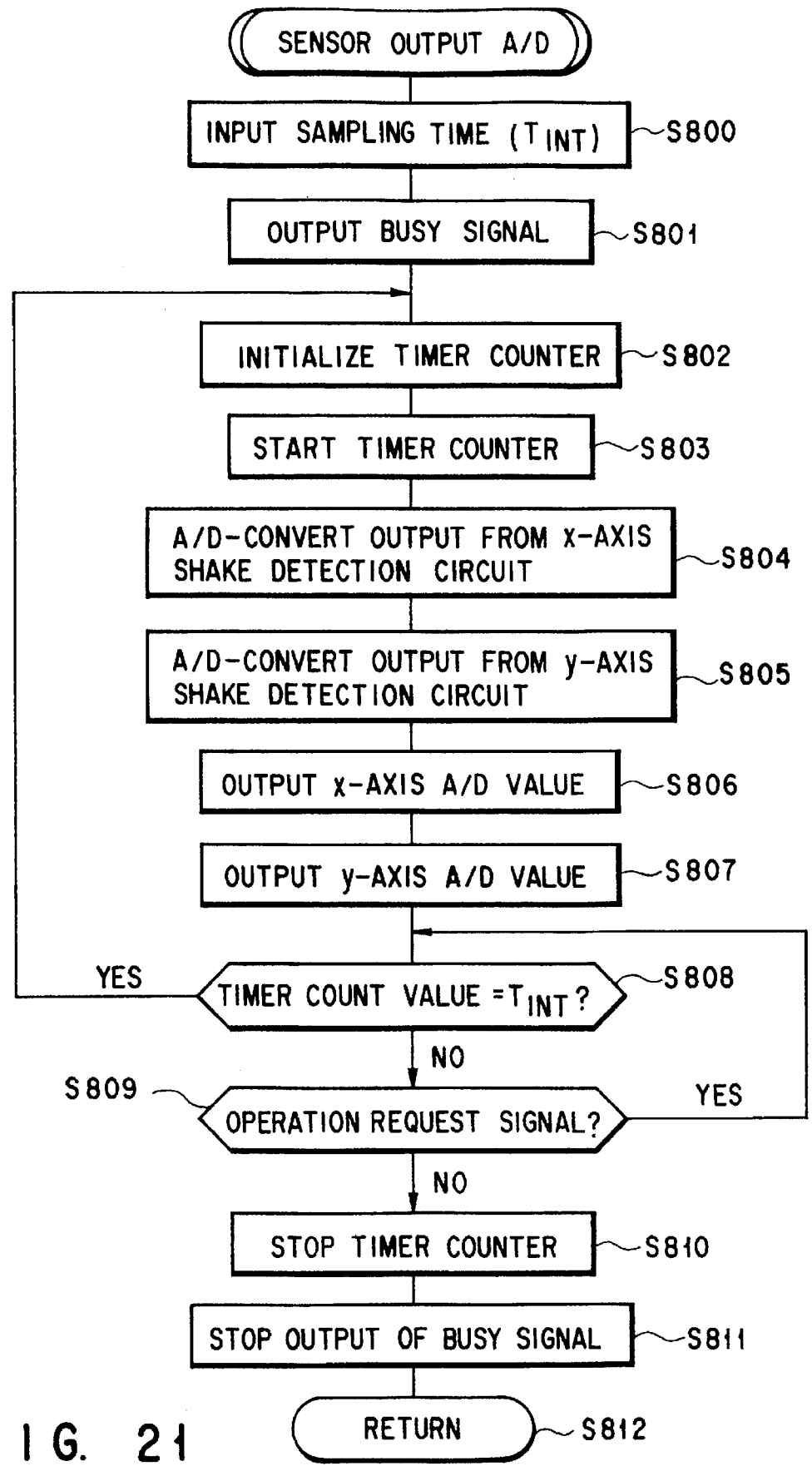
FIG. 21 is a flow chart showing the sequence of a subroutine "sensor output A/D" in FIG. 13.
Figure 22:
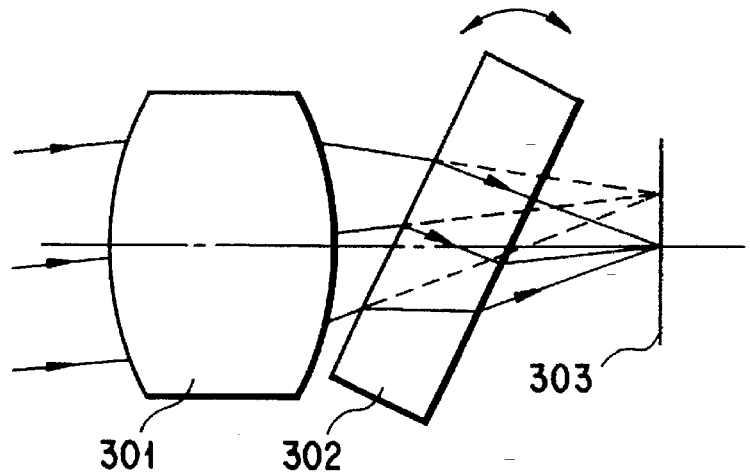
FIG. 22 is a view showing the arrangement of a conventional image blurring correction optical system used for an image pickup apparatus such as a camera.
Figure 23:
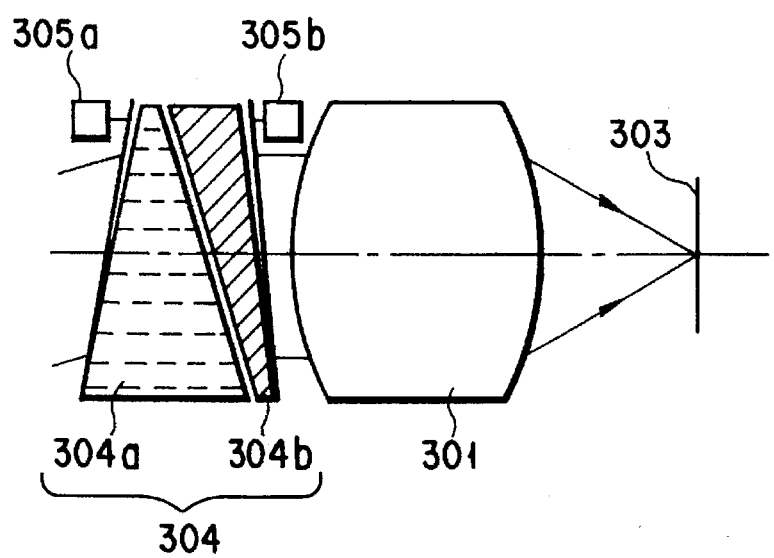
FIG. 23 is a view showing the arrangement of another conventional image blurring correction optical system used for an image pickup apparatus such as a camera.

The sequence of the subroutine "sensor output A/D" executed by the SμCOM 83 will be described next with reference to the flow chart of FIG. 21. The SμCOM 83 receives data indicating the sampling timing (TINT) via the terminals p-CLK and p-DATA. The SμCOM 83 A/D-converts outputs from the shake detection circuits 87 and 88 at the intervals TINT. The SμCOM 83 outputs the conversion results to the MμCOM 1 (step S80). The SμCOM 83 then changes the output terminal p-BUSY from high level "H" to low level "L" (step S801). The SμCOM 83 initializes the timer counter (step S802) and state a counter operation. The timer counter is used to measure the intervals of A/D conversion (step S803).

Subsequently, the SμCOM 83 A/D-converts an output from the x-axis shake detection circuit 88 (step S804), and also A/D-converts an output from the y-axis shake detection circuit 87 (step S805). These two data having undergone conversion are output from the terminals p-CLK and p-DATA of the SμCOM 83 (steps S806 and S807). The SμCOM 83 then alternately executes the following two determination processes (steps S808 and S809). One determination process is performed to check whether the value of the timer counter has reached the value TINT. If the value of the timer counter is equal to the value TINT, the SμCOM 83 shifts from step S808 to step S802 to execute the next A/D conversion. The other determination process is executed to check whether an operation request signal is received. The SμCOM 83 checks in step S809 whether the input terminal p-RQ has changed from low level "L" to high level "H". When a signal from the terminal p-RQ changes to high level "H", the SμCOM 83 must stop operating. At this time, the SμCOM 83 shifts from step S809 to step S810. The SμCOM 83 then stops the count operation of the timer counter (step S810), changes the terminal p-BUSY from low level "L" to high level "H" (step S811), and returns the flow to the main routine (step S812).

As described in detail above, according to the present invention, the image blurring correction function can be quantitatively evaluated by using the shake compensation test mode based on external communication. The use of this function especially in the manufacturing process of a camera having a shake compensation function greatly contributes to quality maintenance of the shake compensation function.

According to the above embodiment of the present invention, there is provided (1) a camera system including
a camera vibration detection means,
an optical correction means for reducing the displacement amount of an image in response to an output from the vibration detection means, and driving means for driving the correction optical system, comprising:
an input means for inputting an external command signal to the camera;
a mode setting means for setting the camera in a test mode in accordance with the command signal; and
control means for controlling at least one of the detection means and the driving means in accordance with a set result from the mode setting means.

(2) In the camera system (1), the test mode includes a mode of executing a correcting operation with respect to only vibrations around a predetermined axis.

(3) In the camera system (1), the test mode includes an operation mode of driving an actuator connected to the optical correction means in a predetermined direction by a predetermined amount.

(4) In the camera system (1), the test mode includes a mode of converting an output from the vibration detection means into a digital signal and outputting the signal outside the camera.

(5) There is also provided a camera system including a camera capable of preventing an image on a film exposure surface from blurring due to a vibration of the camera, comprising:
a detection means for detecting the vibration;
a connection terminal for inputting an external command signal to the camera; and
control means for controlling the detection means and the optical correction means on the basis of the command signal from the connection terminal.

Note that the present invention can be widely applied to general optical apparatuses as well as camera systems.

According to the present invention, therefore, there is provided an optical apparatus such as a camera system which can quantitatively measure and evaluate the operation of an image blurring correction function by adding an effective shake compensation test function to the apparatus.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera which can suppress blurring of a photographed image due to a vibration of said camera, comprising:
(a) first and second vibration detection means for detecting vibrating states of said camera with respect to first and second orthogonal axes around a photographing optical axis of said camera;
(b) correction means including a correction optical system arranged between a photographing optical system of said camera and a film exposure surface and having two axes of freedom corresponding to the first and second axes;
(c) control means for controlling said correction optical system;
(d) a communication terminal for allowing external communication between an external device located outside said camera and said control means in said camera; and
(e) test mode means for performing a predetermined operation in accordance with a test mode command externally input from the external device to said camera via said communication terminal,
wherein said test mode means includes:
means for arbitrarily controlling at least one of said first and second vibration detection means and said correction means in accordance with a test mode command externally input from the external device to said camera via said communication terminal; and
means for outputting at least one output from said first and second vibration detection means and said correction means to the external device.

2. A camera which can suppress blurring of a photographed image due to a vibration of said camera, comprising:
(a) first and second vibration detection means for detecting vibrating states of said camera with respect to first and second orthogonal axes around a photographing optical axis of said camera;
(b) correction means including a correction optical system arranged between a photographing optical system of said camera and a film exposure surface and having two axes of freedom corresponding to the first and second axes;
(c) first control means for controlling said vibration detection means and said correction optical system;
(d) second control means for controlling a camera function other than said vibration detection means and said correction means;
(e) a communication terminal for allowing external communication between an external device located outside said camera and said first control means in said camera; and
(f) test mode means for performing a predetermined operation in accordance with a test mode command externally input from the external device to said camera via said communication terminal,
wherein said test mode means includes:
means for arbitrarily controlling at least one of said vibration detection means and said correction means in accordance with a test mode command externally input from the external device to said camera via said communication terminal; and
means for outputting at least one output from said first and second vibration detection means and said correction means to the external device.

3. A camera including camera vibration detection means, optical correction means for reducing a displacement amount of a photographed image in response to an output from said vibration detection means, and driving means for driving said optical correction means, the camera further comprising:
(a) input means for inputting an external command signal to said camera;
(b) mode setting means for setting said camera in a test mode in accordance with a command signal externally input by said input means; and
(c) control means for controlling at least one of said vibration detection means and said driving means in response to a set result from said mode setting means,
wherein said mode setting means includes means for setting an operation mode of outputting an output from said vibration detection means outside said camera.

4. A camera according to claim 3, wherein said mode setting means includes means for setting an operation mode of executing a correcting operation with respect to only a vibration around a predetermined axis of said camera.

5. A camera according to claim 3, wherein said mode setting means includes means for setting an operation mode of driving an actuator coupled to said optical correction means in a predetermined direction by a predetermined amount.

6. A camera which can prevent blurring of an image on a film exposure surface due to a vibration of said camera, comprising:
   (a) detection means for detecting vibration of said camera;
   (b) optical correction means for deflecting a photographing light beam reaching a film;
   (c) a connection terminal for inputting an external command signal from an external device located outside said camera to said camera; and
   (d) control means for controlling at least one of said detection means and said optical correction means in accordance with a command signal externally input by said connection terminal, and for outputting at least one output from said detection means and said optical correction means to the external device.

7. A camera for preventing blurring of a photographed image due to a camera vibration, comprising:
   (a) vibration detection means for detecting vibration of said camera in two axis directions perpendicular to a photographing optical axis of said camera;
   (b) an optical member pivotally arranged in the two axis directions and adapted to deflect a photographing light beam;
   (c) control means for generating a signal for controlling pivotal movement of said optical member on the basis of at least vibration information detected by said vibration detection means;
   (d) driving means for causing said optical member to pivot in response to a signal output from said control means; and
   (e) coupling means for electrically coupling said control means to an external unit located outside said camera to allow communication between the external unit and said control means inside said camera,
   wherein said control means outputs a signal from said vibration detection means to the external unit when the external unit is coupled to said coupling means.

8. A camera according to claim 7, wherein said control means includes means for performing two-way communication between the external unit and said control means inside said camera when the external unit is coupled to said coupling means, and means for quantitatively evaluating an image blurring prevention in accordance with the signal output from said vibration detection means.

9. A camera according to claim 7, wherein said control means includes means for controlling said driving means in response to a control signal from the external unit when the external unit is coupled to said coupling means.

10. An optical apparatus including:
   shake detection means for detecting a shake of an optical axis of an optical system included in said optical apparatus;
   an image blurring correction optical system arranged on the optical axis and adapted to correct detected shakes;
   image blurring correction means for controlling said image blurring correction optical system on the basis of an output from said shake detection means; and
   means for executing a check operation with respect to at least one of said shake detection means and said image blurring correction means,
   wherein said means for executing the check operation comprises:
      reception means for receiving an external signal from an external device located outside said optical apparatus;
      supply means for supplying a control signal to at least one of said shake detection means and said image blurring correction means in accordance with a reception signal received by said reception means; and
      means for outputting at least one output from said shake detection means and said image blurring correction means to the external device.

11. A camera comprising:
   a shake detection sensor for detecting a shake state of said camera;
   an image blurring correction optical system arranged between a photographing optical system and a film exposure surface;
   a driving mechanism for driving said image blurring correction optical system; and
   a control circuit coupled to said shake detection sensor and to said driving mechanism, said control circuit having a first mode of controlling said driving mechanism on the basis of an output from said shake detection sensor and a second mode of controlling said driving mechanism on the basis of an external signal from an external device located outside said camera,
   wherein said second mode comprises a check operation, and said control circuit includes means for outputting the output from said shake detection sensor to the external device when said camera is operating in said second mode.

12. A camera comprising:
   shake detection means for detecting a shake state of said camera;
   image blurring correction means, including an image blurring correction optical system arranged between a photographing optical system and a film exposure surface, for controlling said image blurring correction optical system on the basis of an output from said shake detection means; and
   means for causing said image blurring correction means to execute an operation different from a normal image blurring correcting operation in response to an external signal from an external device located outside said camera, and for outputting at least one output from said shake detection means and said image blurring correction means to the external device.

13. An optical apparatus comprising:
   shake detection means for detecting a shake of an optical axis of said optical apparatus and for outputting a shake signal;
   image blurring correction means for correcting detected shakes on the basis of the shake signal output from said shake detection means; and
   transmission means for transmitting at least one of the output from said shake detection means and an operation state of said image blurring correction means to an external unit located outside said optical apparatus, when said transmission means executes a transmitting operation in response to a request signal from the external unit.

14. An optical apparatus having an observation optical path, comprising:

shake detection means for detecting a shake of the observation optical path by means of an observation light beam;

communication means for executing two-way communication between said optical apparatus an external unit located outside said optical apparatus; and shake cancel means, including light beam deflecting means arranged in the observation optical path, for canceling detected shakes of the observation optical path in accordance with a command from the external unit, wherein said two-way communication between said optical apparatus and the external unit is carried out to evaluate shake cancellations in accordance with an output supplied from said shake detection means to the external unit.

15. A camera including camera vibration detection means, optical correction means for reducing a displacement amount of a photographed image in response to an output from said vibration detection means, and driving means for driving said optical correction means, the camera further comprising:

(a) input means for inputting an external command signal to said camera;

(b) mode setting means for setting said camera in a test mode in accordance with a command signal externally input by said input means; and (c) control means for controlling at least one of said vibration detection means and said driving means in response to a set result from said mode setting means, wherein said mode setting means includes means for setting an operation mode of executing a correcting operation with respect to only a vibration around a predetermined axis for said camera.

* * * * *